United States Patent
Tsukahara

(10) Patent No.: US 7,719,724 B2
(45) Date of Patent: May 18, 2010

(54) BLACK-LEVEL FEEDBACK DEVICE, IMAGE READING DEVICE, AND BLACK-LEVEL FEEDBACK CONTROL METHOD

(75) Inventor: Hajime Tsukahara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 494 days.

(21) Appl. No.: 11/681,432

(22) Filed: Mar. 2, 2007

(65) Prior Publication Data
US 2007/0216915 A1 Sep. 20, 2007

(30) Foreign Application Priority Data
Mar. 17, 2006 (JP) ............................. 2006-075555

(51) Int. Cl.
*H04N 1/40* (2006.01)
(52) U.S. Cl. .................. 358/3.24; 358/1.9; 358/3.26; 358/500; 358/505; 358/514; 358/516; 358/518; 358/529; 348/528; 348/657; 348/678
(58) Field of Classification Search .................. 358/1.9, 358/3.24, 3.26, 516, 518, 529; 348/528, 348/657, 678
See application file for complete search history.

(56) References Cited

U.S. PATENT DOCUMENTS

| | | | | |
|---|---|---|---|---|
| 4,597,087 A | * | 6/1986 | Kadin | 375/134 |
| 5,189,528 A | * | 2/1993 | Takashima et al. | 358/448 |
| 5,402,252 A | * | 3/1995 | Kojima | 358/486 |
| 5,689,623 A | * | 11/1997 | Pinard | 358/1.6 |
| 6,160,578 A | * | 12/2000 | Carroll et al. | 348/222.1 |
| 6,246,729 B1 | * | 6/2001 | Richardson | 375/324 |
| 6,437,833 B1 | * | 8/2002 | Tagomori et al. | 348/657 |
| 6,762,784 B2 | * | 7/2004 | Skillman | 347/239 |
| 6,940,553 B1 | * | 9/2005 | Katoh | 348/311 |

(Continued)

FOREIGN PATENT DOCUMENTS

EP 0 739 089 A2 10/1996

(Continued)

OTHER PUBLICATIONS

U.S. Appl. No. 12/113,509, filed May 1, 2008, Tsukahara.

(Continued)

*Primary Examiner*—King Y Poon
*Assistant Examiner*—Richard Z Zhu
(74) *Attorney, Agent, or Firm*—Oblon, Spivak, McClelland, Maier & Neustadt, L.L.P.

(57) ABSTRACT

A first set-value calculating unit calculates a first set value of a black-level feedback based on a reflection amount that increases a speed of tracking to a black-level target value in a black-level feedback control. A second set-value calculating unit calculates a second set value of a black-level feedback based on a reflection amount that slows down a tracking to a black-level target value as compared to the speed of tracking of the first set-value calculating unit. A selecting unit selects and outputs any one of the first set value and the second set value and outputs selected value as a set value. A controlling unit controls selection of any one of the first set value and the second set value by the selecting unit based on the black differential value and a gain of the image data.

10 Claims, 20 Drawing Sheets

U.S. PATENT DOCUMENTS

| | | | |
|---|---|---|---|
| 7,068,397 B2 * | 6/2006 | Sugano et al. | 358/409 |
| 7,580,588 B2 * | 8/2009 | Minami et al. | 382/274 |

FOREIGN PATENT DOCUMENTS

| | | |
|---|---|---|
| JP | 6-14188 | 1/1994 |
| JP | 2001-211281 | 8/2001 |
| JP | 2003-332908 | 11/2003 |
| JP | 2005-151296 | 6/2005 |
| JP | 3828296 | 7/2006 |

OTHER PUBLICATIONS

U.S. Appl. No. 11/851,639, filed Sep. 7, 2007, Kanno et al.
U.S. Appl. No. 11/932,168, filed Oct. 31, 2007, Tsukahara et al.

* cited by examiner

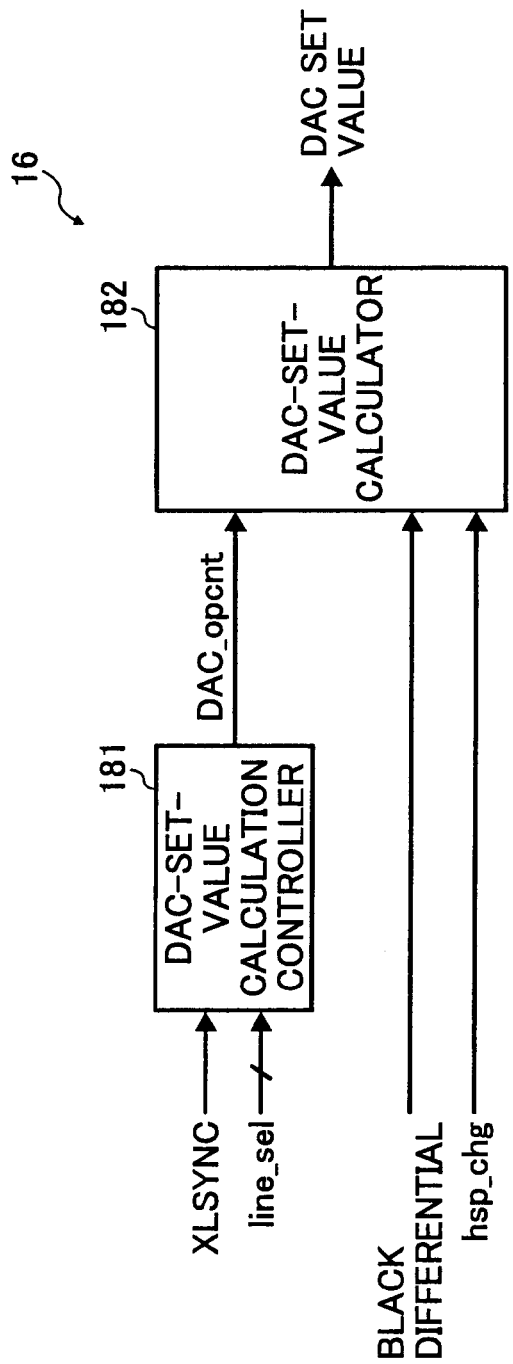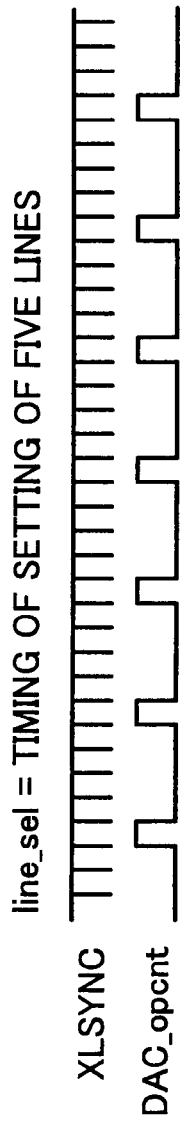

BACKGROUND ART

BACKGROUND ART

BLACK-LEVEL FEEDBACK DEVICE, IMAGE READING DEVICE, AND BLACK-LEVEL FEEDBACK CONTROL METHOD

CROSS-REFERENCE TO RELATED APPLICATIONS

The present document incorporates by reference the entire contents of Japanese priority document, 2006-075555 filed in Japan on Mar. 17, 2006.

BACKGROUND OF THE INVENTION

1. Field of the Invention

The present invention relates to a black-level feedback device that controls an output of a black-level period of a photoelectric conversion element to an optional device, an image reading device such as an image scanner, a digital copying machine, and a facsimile machine, and also relates to a black-level feedback control method.

2. Description of the Related Art

Among various kinds of image reading devices such as an image scanner, a digital copying machine, and a facsimile machine, there are some devices that sample image data of a light non-incident part of charge-coupled devices (CCDs) as photoelectric conversion elements, and set a concentration level as a black reference level, at the time of carrying out a quantization (for example, see Japanese Patent Application Laid-open No. H6-14188).

Further, among conventional image reading devices, there are devices that carry out image signal processing including a black-level correction process as shown in FIG. 21. As shown in FIG. 21, a CCD 201 reads an image of a document, and outputs an analog image signal to a signal processing integrated circuit (IC) 202. The signal processing IC 202 includes a sample holding circuit 203, a programmable gain amplifier 204, an analog-to-digital (AD) converter 205, and black-level correcting circuits 206 to 209. The sample holding circuit 203 samples an analog image signal from the CCD 201, based on a sample pulse, and holds a sample level, thereby forming a continuous analog image signal. The programmable gain amplifier 204 amplifies the continuous analog image signal at a predetermined gain. The AD converter 205 converts this signal into digital data. The digital data obtained by conversion by the AD converter 205 is supplied to the latter stage for processing, and is also feedback to the black-level correcting circuits 206 to 209.

The feedback processing carried out by the black-level correcting circuit is explained. A black average processor 206 averages assigned pixels of image data in one line during a black level period or a period corresponding to a black level (hereinafter, a result of the average processing is described as a black detection level). The black average processor 206 calculates a difference (hereinafter, "black differential") between a black-level target value 207 determined in advance and the black detection level. The black average processor 206 converts a black differential value into a digital-to-analog (DA) converter code by a proportion set in advance by a digital-to-analog-conversion (DAC) set value calculator 208, and reflects the DA converter code to a black correction DAC 209. This processing is carried out for each one line, thereby converging the black detection level to the black-level target value 207. The above series of a black correcting circuit operation are hereinafter described as a black-level feedback control.

FIG. 22 is a schematic of an image format of image data output from a CCD. XLSYNC is a cycle line of one line. After XLSYNC="L", the CCD 201 outputs image data in the order of a preliminary-feeding image, an optical black (OPB) image, and a valid image. Both the preliminary-feeding image and the OPB image are black-level image data of the CCD 201. BLKCLP becomes active during the black level period of the CCD 201. The black average processor 206 averages the assigned pixels during an "H" period, and establishes a black detection level.

According to the above conventional example, when the pixel density becomes higher, and also when the image reading speed becomes faster, this increases a clock frequency for driving the photoelectric conversion element such as the CCD 201 which reads images and the signal processing IC 202 which carries out various processing to the image signals output from the photoelectric conversion element at the latter stage. Accordingly, unnecessary radiation of electromagnetic waves increases.

To prevent this inconvenience, a spread spectrum clock generator (SSCG) as a frequency spreader is provided inside or at a latter stage of an oscillator which is used to generate a clock frequency, thereby decreasing the strength of the unnecessary radiation of a peak part of the frequency. In other words, as shown in FIG. 23, the SSCG spreads the clock frequency of a spectrum characteristic S1 to obtain a spectrum characteristic S2, thereby decreasing the strength of the unnecessary radiation to a level smaller than that of the spectrum characteristic S1 of the frequency before the spreading.

However, when the SSCG is used for a driving clock of an analog system, an image signal level cyclically changes in one line even when the same concentration level is read, due to a variation of an output waveform of the CCD 201 and a variation of a sample timing of the signal processing IC 20. Therefore, high and low levels of the image occur.

This problem is explained with reference to FIG. 24. In general, a CCD driving signal is generated from a high-precision reference clock having oscillation precision of 50 parts per million and 100 parts per million, for example. When the frequency is spread to avoid unnecessary radiation, the frequency changes along lapse of time, as shown in the lower part of FIG. 24, where the lateral axis represents time and the vertical axis represent frequency. In other words, the frequency is structured to change smoothly, in a predetermined width of ±0.5% and ±1.0% around a reference frequency. Usually, the frequency has a regular frequency spread cycle (frequency cycle). As shown in the lower part of FIG. 24, the frequency changes by a predetermined modulation width to a direction (a high-frequency side: + side) in which the clock cycle becomes short relative to the reference frequency. After this, the frequency changes by a predetermined modulation width to a direction (a low-frequency side: – side) in which the clock cycle becomes long along the same characteristic curve. The frequency repeats this modulation cycle, and returns to the reference frequency. Accordingly, the reference frequency and the phase match together at every one half cycle of the modulation cycle. The upper part of FIG. 24 represents an image level variation relative to the modulation cycle. It is understood from this graph that the image level changes in synchronism with the modulation cycle, where the lateral axis represents time and the vertical axis represent an image level. There is also a system in which the modulation cycle changes at random or following a specific rule.

When the above variation of the image level is repeated in many lines, high and low levels occur as fine strings in the read image, and these fine strings appear as lateral strings in human eyes. In other words, a variation of a sub-scanning image level occurs due to the main-scanning image level variation.

A process in which the sub-scanning image level variation occurs is explained with reference to FIG. 25. FIG. 25 depicts a main-scanning black level variation in six lines. The modulation cycle of the SSCG is not synchronized with one line cycle of the device. Therefore, the black level variation has a different phase for each line. In FIG. 25, the phases of the black-level variation match in five-line unit. To average the black levels during the BLKCLP="H" period to obtain a black-level target value, the black-level feedback control is carried out, as described above. However, in the example shown in FIG. 25, the black-level average values detected for each line are different. Because the black-level feedback control is carried out to the different black detection levels to obtain a black-level target value, the offset of the black level varies for each line. Therefore, the sub-scanning offset variation of the same pattern occurs in five lines. This sub-scanning offset variation appears as a thick lateral string in the variation line cycle unit. In the human eyes, the image variation in a constant width tends to be most noticeable. Therefore, rather than the lateral-string image due to the main scanning variation, the lateral-string image due to the sub-scanning variation becomes a problem.

In other words, because the image level variation according to the SSCG has no change in the center level (the black-level center shown in FIG. 25), this image level variation should not basically be corrected by the black-level feedback operation. A variation that needs to be corrected by the black-level feedback operation is the image level variation of which center level changes. For example, there is a phenomenon called a smear in which a black level in a white region is raised when the white region and the black region of a document are being read. In this case, because the center level of the image level variation changes, the image level variation needs to be corrected by the black-level feedback operation.

SUMMARY OF THE INVENTION

It is an object of the present invention to at least partially solve the problems in the conventional technology.

According to an aspect of the present invention, a black-level feedback device executes a black-level feedback control that includes converging a black detection level to a black-level target value, based on a black differential value between the black detection level obtained by averaging assigned pixels of image data in one line output from a photoelectric conversion element during a black-level period or a period corresponding to a black level and the black-level target value determined in advance. The black-level feedback device includes a first set-value calculating unit that calculates and outputs a first set value of a black-level feedback based on a reflection amount that increases a speed of tracking to the black-level target value in the black-level feedback control; a second set-value calculating unit that calculates and outputs a second set value of a black-level feedback based on a reflection amount that slows down a speed of tracking to the black-level target value as compared to the speed of tracking of the first set-value calculating unit; a selecting unit that selects any one of the first set value and the second set value and outputs selected value as a set value; and a controlling unit that controls selection of any one of the first set value and the second set value by the selecting unit based on the black differential value and a gain of the image data.

According to another aspect of the present invention, a black-level feedback device executes a black-level feedback control that includes converging a black detection level to a black-level target value, based on a black differential value between the black detection level obtained by averaging assigned pixels of image data in one line output from a photoelectric conversion element during a black-level period or a period corresponding to a black level and the black-level target value determined in advance. The black-level feedback device includes a line-interval assigning unit that executes the black-level feedback control at line intervals at which black-level variation phases coincide with each other.

According to still another aspect of the present invention, an image reading device executes, at the time of outputting a digital image signal after reading an image by a photoelectric converting element, a black-level feedback control that includes converging a black detection level to a black-level target value, based on a black differential value between the black detection level obtained by averaging assigned pixels of image data in one line output from the photoelectric conversion element during a black-level period or a period corresponding to a black level and the black-level target value determined in advance. The image reading device includes a first set-value calculating unit that calculates and outputs a first set value of a black-level feedback based on a reflection amount that increases a speed of tracking to the black-level target value in the black-level feedback control; a second set-value calculating unit that calculates and outputs a second set value of a black-level feedback based on a reflection amount that slows down a speed of tracking to the black-level target value as compared to the speed of tracking of the first set-value calculating unit; a selecting unit that selects any one of the first set value and the second set value and outputs selected value as a set value; and a controlling unit that controls selection of any one of the first set value and the second set value by the selecting unit based on the black differential value and a gain of the image data.

According to still another aspect of the present invention, a image reading device executes a black-level feedback control that includes converging a black detection level to a black-level target value, based on a black differential value between the black detection level obtained by averaging assigned pixels of image data in one line output from a photoelectric conversion element during a black-level period or a period corresponding to a black level and the black-level target value determined in advance. The black-level feedback device includes a line-interval assigning unit that executes the black-level feedback control at line intervals at which black-level variation phases coincide with each other.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 13 is a block diagram of a configuration of a set value calculator according to a sixth embodiment of the present invention;

FIG. 14 is a timing chart of timings of an XSLSYNC signal and a DAC_opcnt signal;

DETAILED DESCRIPTION OF THE PREFERRED EMBODIMENTS

Exemplary embodiments of the present invention will be explained below in detail with reference to the accompanying drawings.

A first embodiment of the present invention is explained below with reference to FIG. 1 to FIG. 5. An image scanner is applied to the first embodiment as an image reading device.

Figure 1:
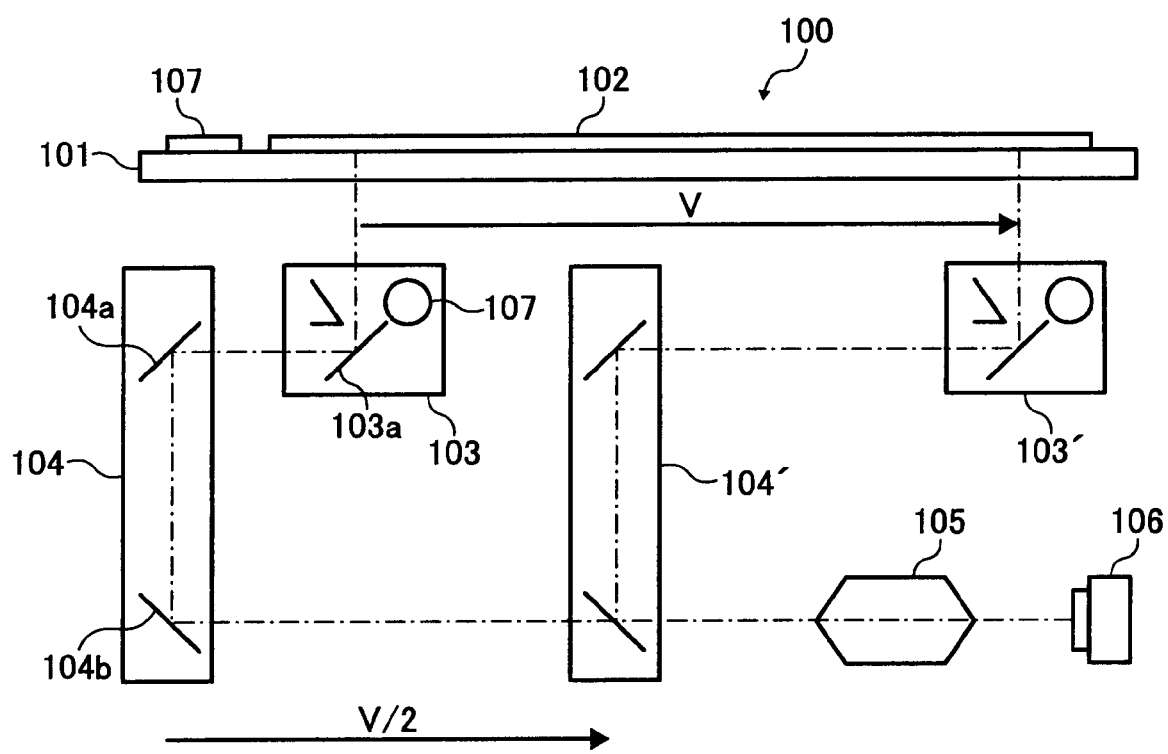
FIG. 1 is a schematic of a configuration of an image scanner according to a first embodiment of the present invention.

FIG. 1 is a schematic of a configuration of an image scanner 100 according to the first embodiment. As shown in FIG. 1, the image scanner 100 irradiates a document 102 from a light source 107 of a first running unit 103 that constitutes an irradiation optical system disposed below a contact glass 101. The irradiation light reflected from the document 102 is reflected and polarized to a mirror 103a of the first running unit 103. The reflected irradiation light is then sequentially reflected and polarized by a first mirror 104a and a second mirror 104b of a second running unit 104. The light enters an image focusing lens 105, and the image focusing lens 105 focuses the image on an incident surface of a CCD 106.

With this configuration, at the time of reading the document, the first running unit 103 moves to a position 103' at a velocity V. At the same time, the second running unit 104 moves to a position 104' at a half velocity of the running velocity of the first running unit 103, that is, at ½V. Accordingly, the image scanner 100 can read the whole document 102 in the longitudinal direction.

The image scanner 100 has a reference whiteboard 107 to generate shading data. The reference whiteboard 107 has a reference of a white level of the image scanner 100 determined in advance. In other words, an output level (hereinafter, "white level target value") after reading the reference whiteboard 107 is determined in advance. A shading correction is carried out by adjusting a gain of a programmable gain amplifier (PGA) so that the reading level of the reference whiteboard 107 becomes the white level target value.

Figure 2:
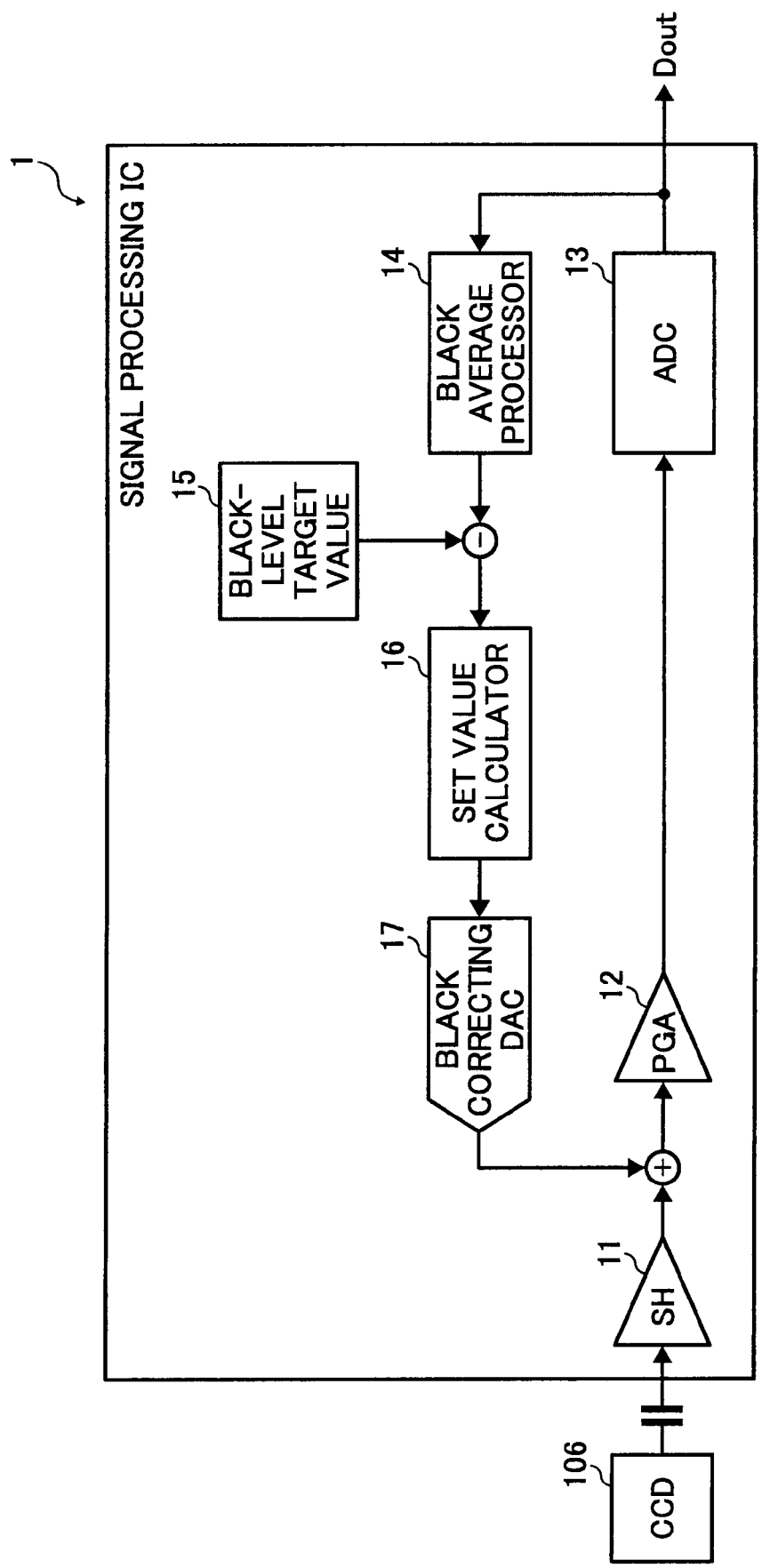
FIG. 2 is a block diagram of a configuration of a signal processing IC incorporated in an image scanner.

FIG. 2 is a block diagram of a configuration of a signal processing IC incorporated in the image scanner 100. As shown in FIG. 2, the CCD 106 reads an image of a document, and outputs an analog image signal to a signal processing IC 1. The signal processing IC 1 functions as a black-level feedback device, and includes a sample holding circuit (SH) 11, a programmable gain amplifier (PGA) 12, an AD converter (ADC) 13, and black-level correcting circuits 14 to 17. An analog image signal from the CCD 106 is supplied to the sample holding circuit 11. The sample holding circuit 11 samples the received analog image signal based on a sample pulse, and holds the sampled level, thereby forming a continuous analog image signal. The programmable gain amplifier 12 amplifies a gain to a predetermined gain (gain), and the AD converter 13 converts the gain-amplified analog data into digital data. The digital data obtained by the AD conversion by the AD converter 13 is supplied to the latter stage for processing, and is also feedback to the black-level correcting circuits 14 to 17.

The feedback processing carried out by the black-level correcting circuits is explained. The black average processor 14 averages assigned pixels of image data in one line during a black level period or a period corresponding to a black level (hereinafter, a result of the average processing is described as a black detection level). The black average processor 14 calculates a difference (hereinafter, "black differential") between a black-level target value 15 determined in advance and the black detection level. The black average processor 14 converts a black differential value into a DA converter code by a proportion set in advance by the set value calculator 16, and reflects the DA converter code to a black correcting DAC 17. This processing is carried out for each one line, thereby converging the black detection level to the black-level target value 15. The above series of a black correcting circuit operation are hereinafter described as a black-level feedback control.

Figure 3:
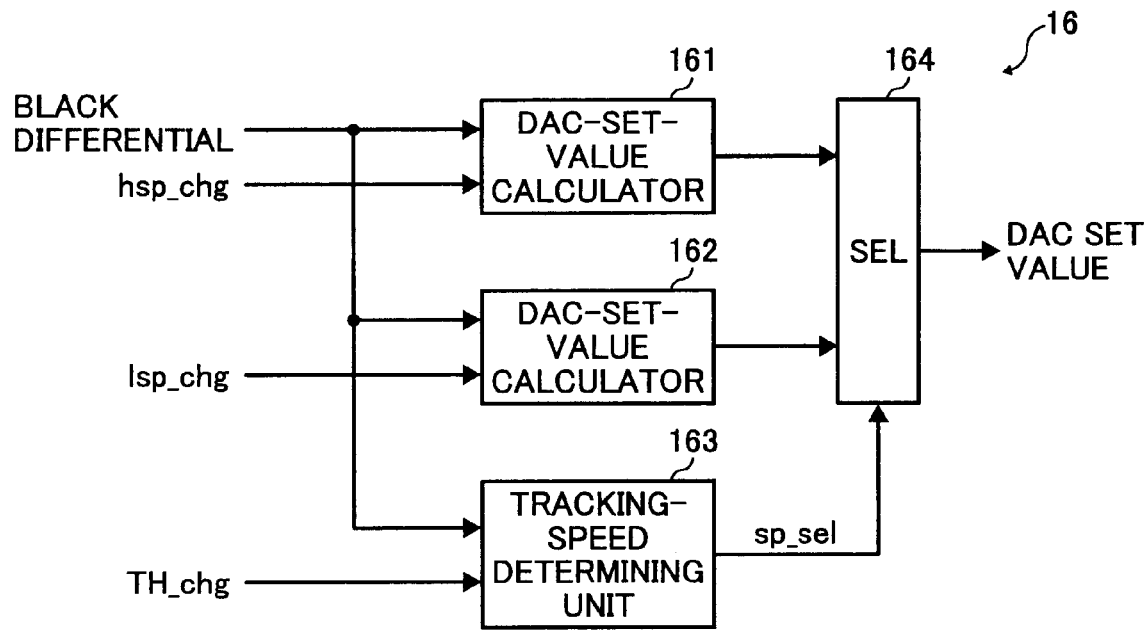
FIG. 3 is a block diagram of a configuration of a set value calculator.

The set value calculator 16 according to the first embodiment is described in detail. FIG. 3 is a block diagram of a configuration of the set value calculator 16. As shown in FIG. 3, the set value calculator 16 includes a first DAC-set-value calculator (a first set value calculator) 161 as a circuit that controls a reflection amount of a black differential to the black correcting DAC 17, a second DAC-set-value calculator (a second set value calculator) 162 as a circuit that controls a reflection amount of a black differential to the black correcting DAC 17, a tracking-speed determining unit 163 that determines a tracking speed, and a selecting unit (SEL) 164 that selects an output of either the first DAC-set-value calculator 161 or the second DAC-set-value calculator 162.

The first DAC-set-value calculator 161 can change a reflection amount based on an hsp_chg signal. The second DAC-set-value calculator 162 can change a reflection amount based on an lsp_chg signal.

The tracking-speed determining unit 163 controls the output of the SEL 164 based on a black differential value, and selects the output of the first DAC-set-value calculator 161 or the output of the second-DAC set-calculator 162, and sets the selected output to the black correcting DAC 17. The tracking-speed determining unit 163 has a threshold level inside, and compares the threshold level with the black differential, thereby controlling an sp_sel signal. The tracking-speed determining unit 163 can change the threshold level of the black differential level based on a TH_chg signal.

In other words, the set value calculator 16 sets the threshold level determined by the tracking-speed determining unit 163 to an optimum value for each device, increases the reflection amount of the first DAC-set-value calculator 161, and decreases the reflection amount of the second DAC-set-value calculator 162. When the black differential is equal to or larger than the threshold level of the tracking-speed determining unit 163, the set value calculator 16 can select the first DAC-set-value calculator 161. When the black differential is smaller than the threshold level of the tracking-speed determining unit 163, the set value calculator 16 can select the second DAC-set-value calculator 162.

The image level variation due to an SSCG has no change in the center level. Therefore, this image level variation should not be corrected by the black-level feedback control in principle. The variation that needs to be corrected by the black-level feedback control is the image level variation of which center level changes. For example, there is a phenomenon called a smear that a black level in a white region is raised when the white region and the black region of a document are being read. In this case, because the center level of the image level variation changes, the image level variation needs to be corrected by the black-level feedback operation.

It has been confirmed from a result of evaluation that a variation amount of the image level variation due to the SSCG is smaller than the variation amount of the image due to smear as noise (ghost).

Therefore, to cope with the image level variation due to the SSCG, the second DAC-set-value calculator 162 is selected to slow down the tracking. To cope with the image level variation due to smear, the first DAC-set-value calculator 161 is selected to increase the tracking speed. With this arrangement, a variation of the sub-scanning offset level attributable to the image level variation due to the SCCG can be decreased. This feature is described in detail below.

Figure 4:
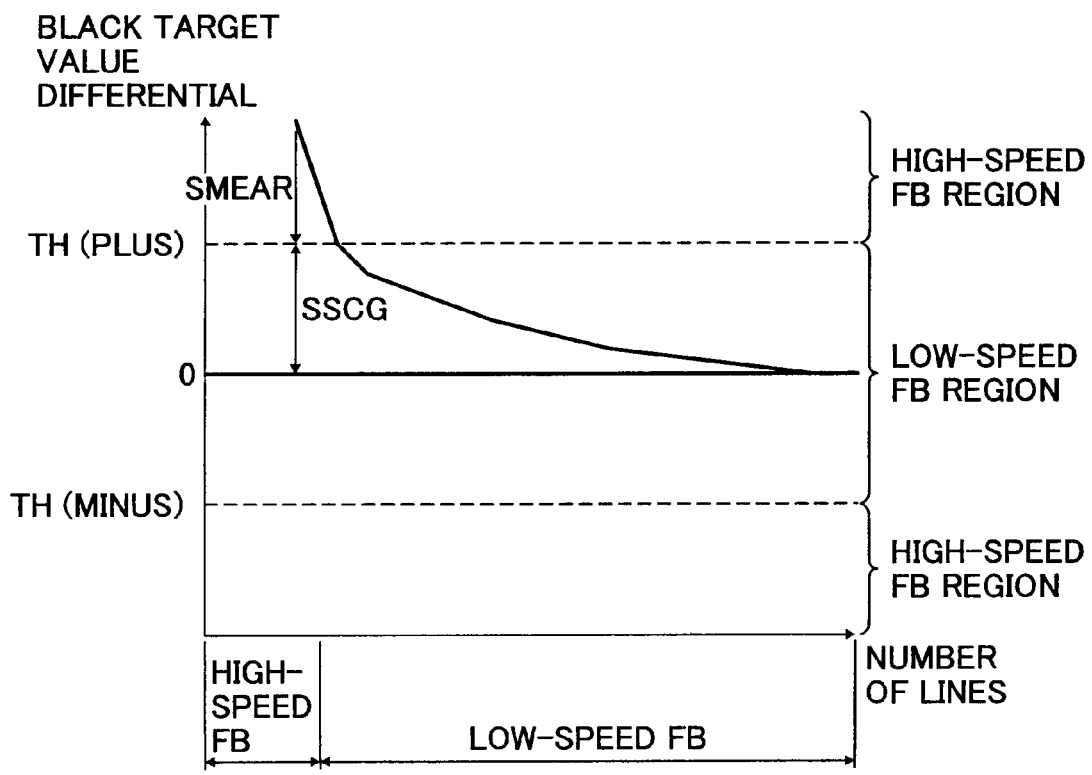
FIG. 4 is a graph of a threshold level of a tracking-speed determining unit.

FIG. 4 is a graph of a threshold level of the tracking-speed determining unit 163. In the graph shown in FIG. 4, the vertical axis represents a black differential, and the lateral axis represents a number of lines. The black differential to TH (plus) and TH (minus) as threshold levels of the tracking-speed determining unit 163 sets the tracking speed differential to zero. As shown in FIG. 4, the black differential=0 indicates that the black-level target value coincides with the black detection level. In FIG. 4, high-speed FB (feedback) means a "large" setting of a black differential reflection amount, and low-speed FB (feedback) means a "small" setting of a black differential reflection amount.

The image level variation due to the SSCG and the image level variation due to smear are proportional to the gain of the PGA 12. Therefore, it can be understood that always stable black feedback control can be carried out by controlling the threshold level through the control of the TH_chg signal to the tracking-speed determining unit 163 based on the gain of the PGA 12.

Figure 5:
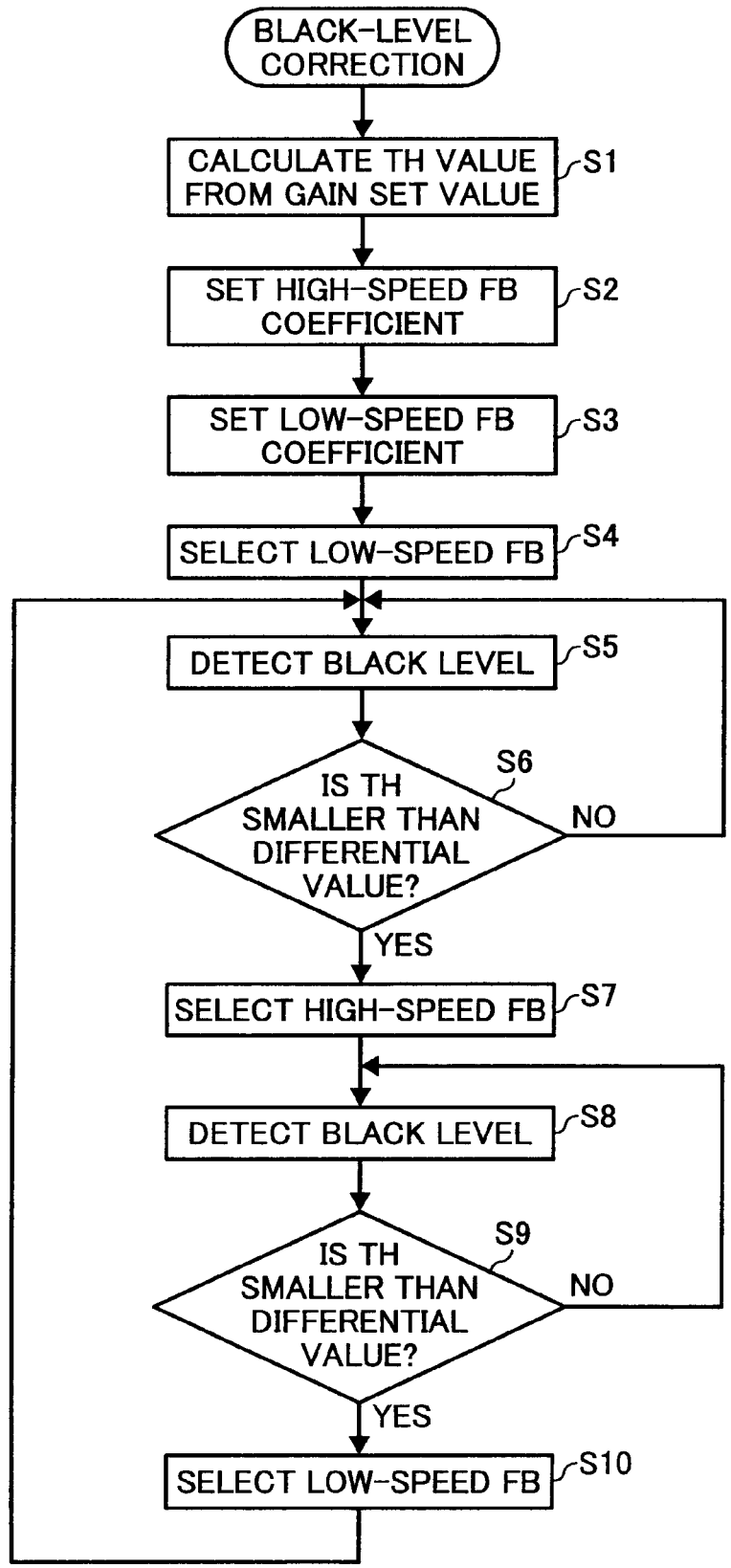
FIG. 5 is a flowchart of a black-level correction process as an operation example of a black-level feedback control.

FIG. 5 is a flowchart of a black-level correction process as an operation example of the black-level feedback control. As shown in FIG. 5, the black-level correction process is carried out as follows. First, the threshold level TH of the tracking-speed determining unit 163 of the set value calculator 16 is calculated based on the gain set value of the PGA 12 (step S1).

Next, a reflection amount (high-speed FB coefficient) of the first DAC-set-value calculator 161 is set based on the hsp_chg signal (step S2), and a reflection amount (low-speed FB coefficient) of the second DAC-set-value calculator 162 is set based on the lsp_chg signal (step S3). In the first embodiment, it is explained that a high-speed FB is being set when the reflection amount set value of the first DAC-set-value calculator 161 is "large", and a low-speed FB is being set when the reflection amount set value of the second DAC-set-value calculator 162 is "small".

The tracking-speed determining unit 163 selects the low-speed FB output of the second DAC-set-value calculator 162 (step S4), and carries out a black-level detection (step S5). The black-level detection at step S5 is carried out until when the black differential value is larger than the threshold level of the second DAC-set-value calculator 162 (YES at step S6), and is repeatedly carried out in a line unit.

When it is determined that the black differential value is larger than the threshold level of the second DAC-set-value calculator 162 (YES at step S6), the tracking-speed determining unit 163 selects the high-speed FB output of the first DAC-set-value calculator 161 (step S7), and carries out the black-level detection (step S8). The black-level detection at step S8 is carried out until when the black differential value is not larger than the threshold level of the first DAC-set-value calculator 161 (YES at step S9), and is repeatedly carried out in a line unit.

When it is determined that the black differential value is not larger than the threshold level of the first DAC-set-value calculator 161 (YES at step S9), the tracking-speed determining unit 163 selects again the low-speed FB output of the second DAC-set-value calculator 162 (step S10), and repeats the processing at step S5.

As described above, according to the first embodiment, the tracking speed of the black-level feedback is controlled based on the gain and the black differential value of the programmable gain amplifier (PGA) 12, thereby decreasing the offset variation of sub-scanning according to the black-level feedback.

A second embodiment of the present invention is explained next with reference to FIG. 6 to FIG. 8. Parts corresponding to those according to the first embodiment are denoted with like reference numerals, and redundant explanations will be omitted.

In the image scanner 100 according to the second embodiment, a configuration of the set value calculator 16 is different from that according to the first embodiment.

Figure 6:
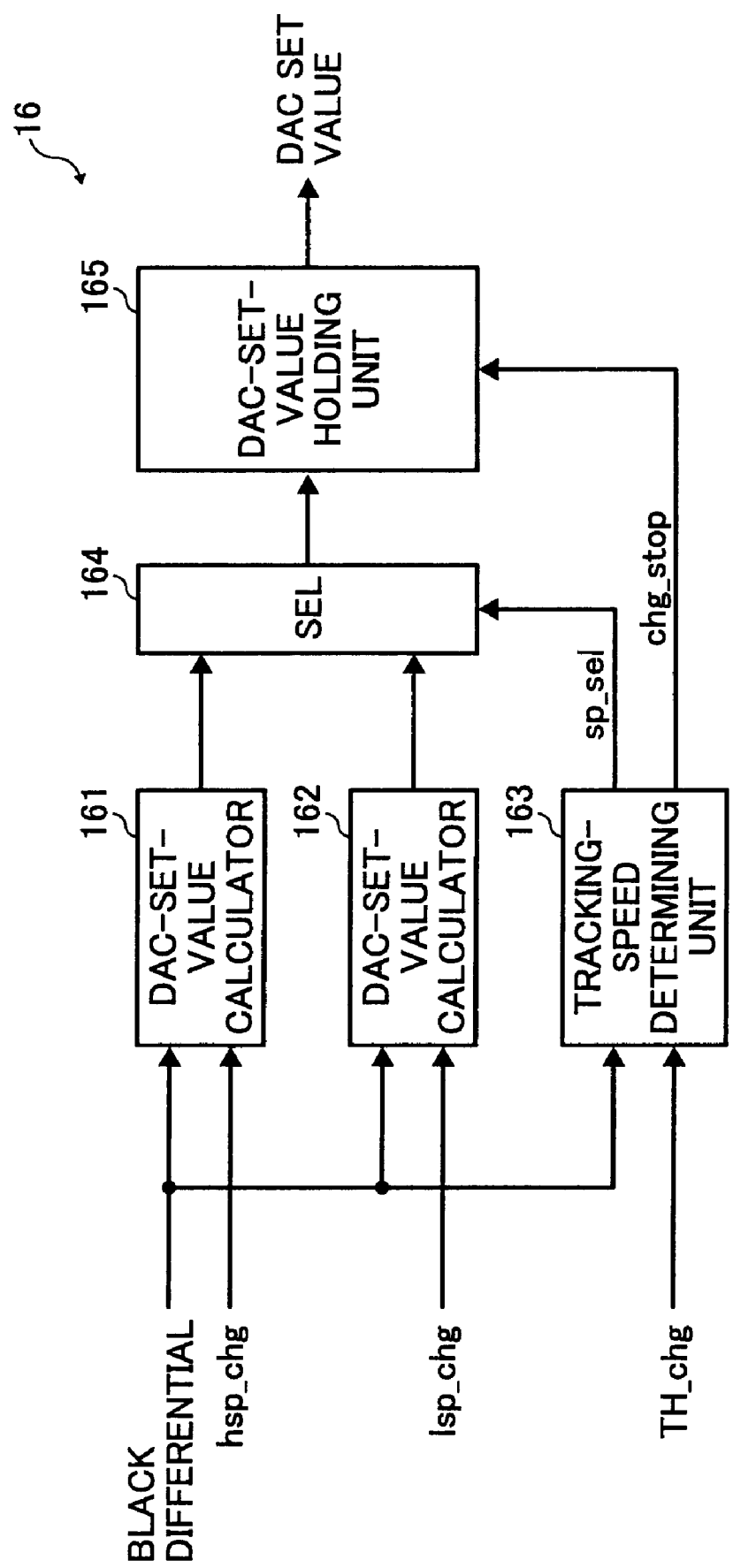
FIG. 6 is a block diagram of a configuration of a set value calculator according to a second embodiment of the present invention.

FIG. 6 is a block diagram of a configuration of the set value calculator 16 according to the second embodiment. As shown in FIG. 6, the set value calculator 16 according to the second embodiment includes a DAC-set-value holding unit 165 in addition to the configuration explained in the first embodiment. Further, a chg_stop signal control is added to the tracking-speed determining unit 163.

The tracking-speed determining unit 163 controls the output of the SEL 164 based on a black differential value, and selects the output of the first DAC-set-value calculator 161 or the output of the second DAC-set-value calculator 162, and sets the selected output to the black correcting DAC 17. Further, the tracking-speed determining unit 163 updates and controls the DAC set value held by the DAC-set-value holding unit 165. The tracking-speed determining unit 163 has two kinds of threshold levels inside, compares a first threshold level with the black differential, thereby controlling the sp_sel signal, and compares a second threshold level (black target differential) with the black differential, thereby controlling the chag_stop signal. Therefore, the DAC-set-value holding unit 165 updates inside the set value from the SEL 164 when the chg_stop signal="H", and holds the updated set value. Therefore, the DAC-set-value holding unit 165 stops updating the set value from the SEL 164 when the chg_stop signal="L".

Figure 7:
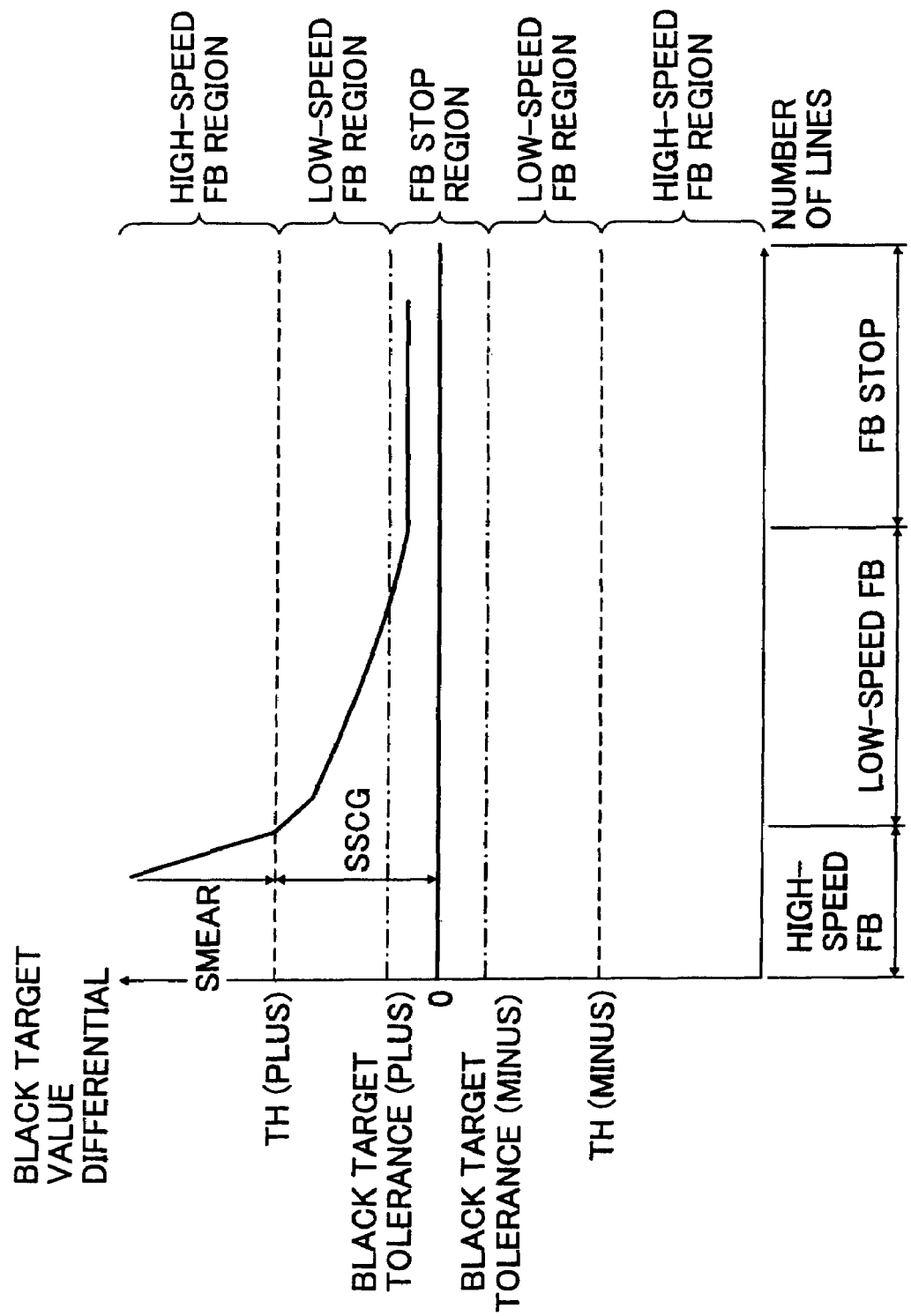
FIG. 7 is a graph of a threshold level of a tracking-speed determining unit.

FIG. 7 is a graph of a threshold level of the tracking-speed determining unit 163. In the graph shown in FIG. 7, the vertical axis represents a black differential, and the lateral axis represents a number of lines. The black differential is tracked within a black target tolerance range, relative to first threshold levels TH (plus) and TH (minus) of the tracking-speed determining unit 163, and second threshold levels of black target tolerance (plus) and black target tolerance (minus) range in which the black differential value can be permitted as a black level variation. In FIG. 7, high-speed FB means a "large" setting of a black differential reflection amount, low-speed FB means a "small" setting of a black differential reflection amount, and FB stop means a stop of an FB (feedback) operation.

In the graph shown in FIG. 7, the black-level feedback operation is stopped as long as the black-level variation does not exceed the second threshold level of the tracking-speed determining unit 163. Therefore, in the range in which the black differential value can be permitted as a black-level variation, the image level variation due to the SSCG is not tracked. Because there is a variation in the averaging precision of the black detection level, the low-speed FB can be applied when the black differential is small.

Figure 8:
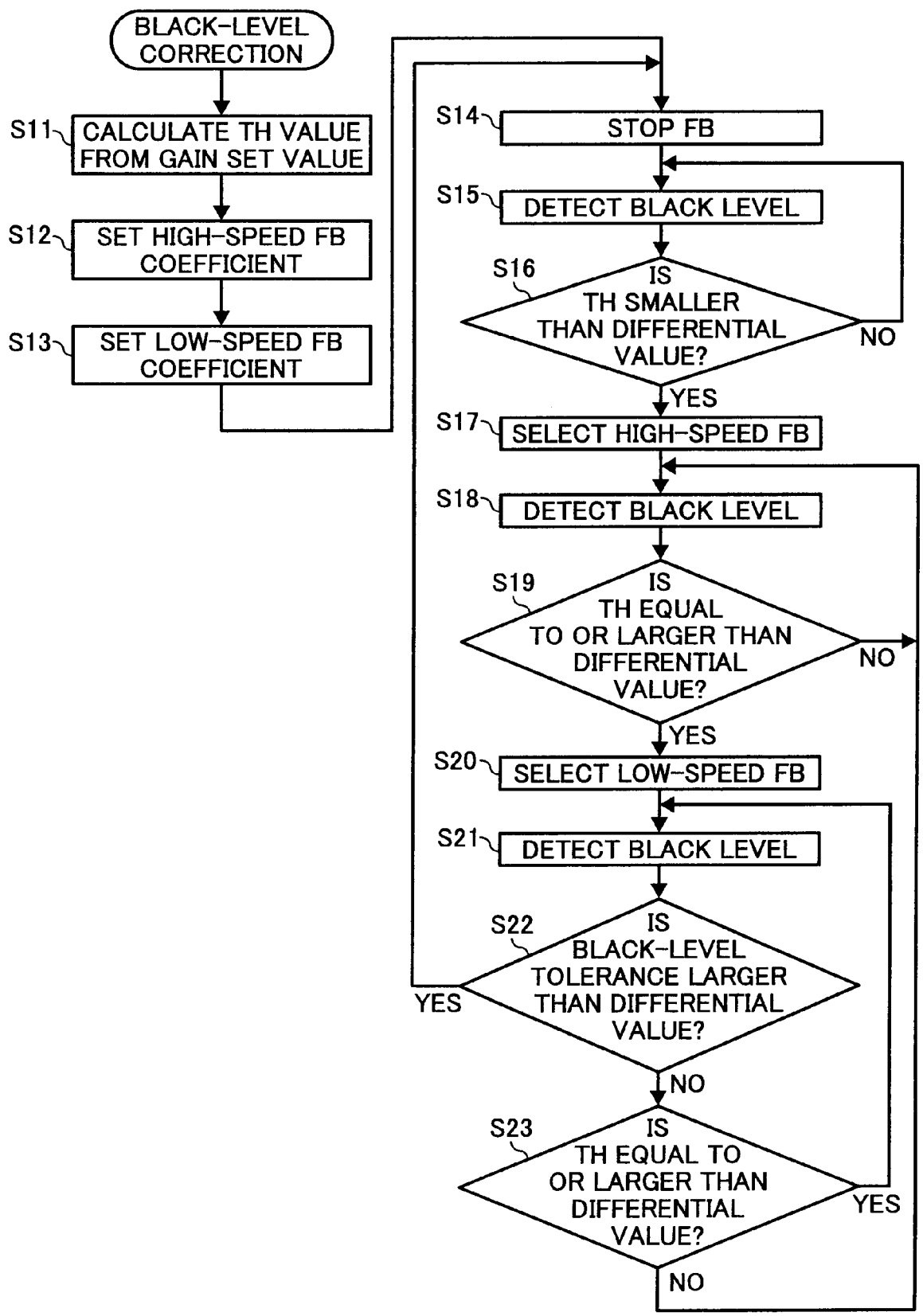
FIG. 8 is a flowchart of a black-level correction process as an operation example of a black-level feedback control.

FIG. 8 is a flowchart of a black-level correction process as an operation example of the black-level feedback control. As shown in FIG. 8, the black-level correction process is carried out as follows. First, the first threshold level and the second threshold level of the tracking-speed determining unit 163 of the set value calculator 16 are calculated based on the gain set value of the PGA 12 (step S11).

Next, a reflection amount (high-speed FB coefficient) of the first DAC-set-value calculator 161 is set based on the hsp_chg signal (step S2), and a reflection amount (low-speed FB coefficient) of the second DAC-set-value calculator 162 is set based on the lsp_chg signal (step S13). In the second embodiment, it is explained that a high-speed FB is being set when the reflection amount set value of the first DAC-set-value calculator 161 is "large", and a low-speed FB is being set when the reflection amount set value of the second DAC-set-value calculator 162 is "small".

The tracking-speed determining unit 163 stops updating the value of the DAC-set-value holding unit 165 as Chg_stop signal="L" (step S14), and carries out a black-level detection (step S15). The black-level detection at step S15 is carried out until when the black differential value is larger than the first threshold level of the tracking-speed determining unit 163 (YES at step S16), and is repeatedly carried out in a line unit.

When it is determined that the black differential value is larger than the first threshold level of the tracking-speed determining unit 163 (YES at step S16), the tracking-speed determining unit 163 selects the high-speed FB output of the first DAC-set-value calculator 161 (step S17), and carries out the black-level detection (step S18).

The black-level detection at step S18 is carried out until when the black differential value is not larger than the first threshold level of the tracking-speed determining unit 163 (YES at step S19), and is repeatedly carried out in a line unit.

When it is determined that the black differential value is not larger than the first threshold level of the tracking-speed determining unit 163 (YES at step S19), the tracking-speed determining unit 163 selects the low-speed FB output of the second DAC-set-value calculator 162 (step S210), and carries out the black-level detection (step S21).

When the black differential value is larger than the second threshold level (black target tolerance) of the tracking-speed determining unit 163 as a result of comparison (NO at step S22), and when the black differential value is not larger than the first threshold level of the tracking-speed determining unit 163 as a result of comparison (YES at step S23), the process returns to step S21, and a black-level detection of the next line is awaited. On the other hand, when the black differential value is larger than the first threshold level of the tracking-speed determining unit 163 as a result of comparison (NO at step S23), the process returns to step S18, and a black-level detection of the next line is awaited.

When the black differential value is smaller than the second threshold level (black target tolerance) of the tracking-speed determining unit 163 as a result of comparison (YES at step S22), the process returns to step S14, the updating of the value of the DAC-set-value holding unit 165 is stopped, and the subsequent process is repeated.

As described above, according to the second embodiment, in controlling the tracking speed of the black-level feedback based on the gain and the black differential value of the programmable gain amplifier (PGA) 12, the black-level feedback is stopped within the black target tolerance range in which the black differential value is permitted as the black-level variation. With this arrangement, the offset variation of sub-scanning can be avoided.

A third embodiment of the present invention is explained next with reference to FIG. 9. Parts corresponding to those according to the first embodiment are denoted with like reference numerals, and redundant explanations will be omitted.

According to the third embodiment, a threshold level for comparing a black differential value has a hysteresis characteristic.

Figure 9:
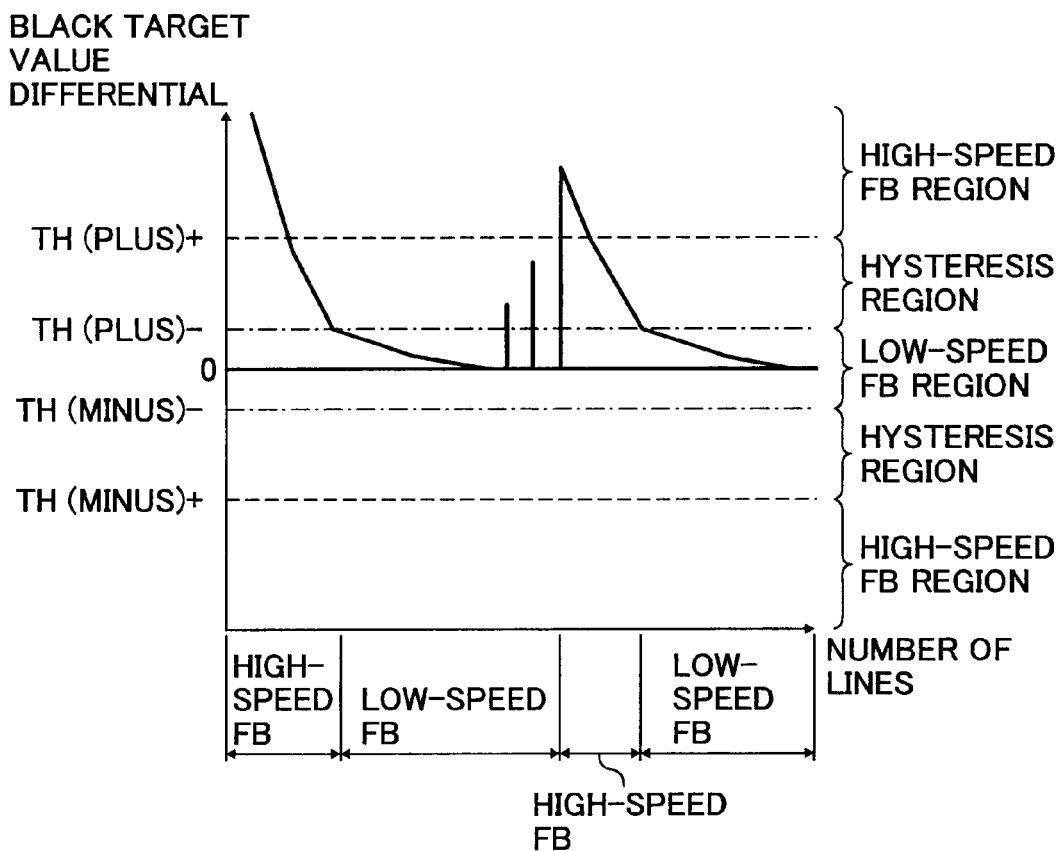
FIG. 9 is a graph of a threshold level of a tracking-speed determining unit according to a third embodiment of the present invention.

FIG. 9 is a graph of a threshold level of the tracking-speed determining unit 163 according to the third embodiment. In the graph shown in FIG. 9, the vertical axis represents a black differential, and the lateral axis represents a number of lines. To add a hysteresis characteristic to the threshold levels TH (plus) and TH (minus) of the tracking-speed determining unit 163, the TH (plus) has a threshold level of TH (plus)+ and TH (plus)−, and the TH (minus) has a threshold level of TH (minus)+ and TH (minus)−.

Therefore, according to the graph shown in FIG. 9, when the black differential value is tracked from the outside of TH (plus)+, a low-speed FB operation is carried out when the black differential becomes within TH (plus)−. Thereafter, the low-speed FB operation is continued until when the black differential value becomes at the outside of TH (plus)+. With this arrangement, a high-speed FB due to noise attributable to the averaging precision of the black detection level can be prevented.

As described above, according to the third embodiment, tracking due to noise can be decreased, by adding a hysteresis characteristic to the threshold level for comparing a black differential value.

A fourth embodiment of the present invention is explained next with reference to FIG. 10 and FIG. 11. Parts corresponding to those according to the first embodiment or the third embodiment are denoted with like reference numerals, and redundant explanations will be omitted.

In the image scanner 100 according to the fourth embodiment, the set value calculator 16 has a configuration different from that of the first embodiment, and a threshold level for comparing a black differential value has a hysteresis characteristic.

Figure 10:
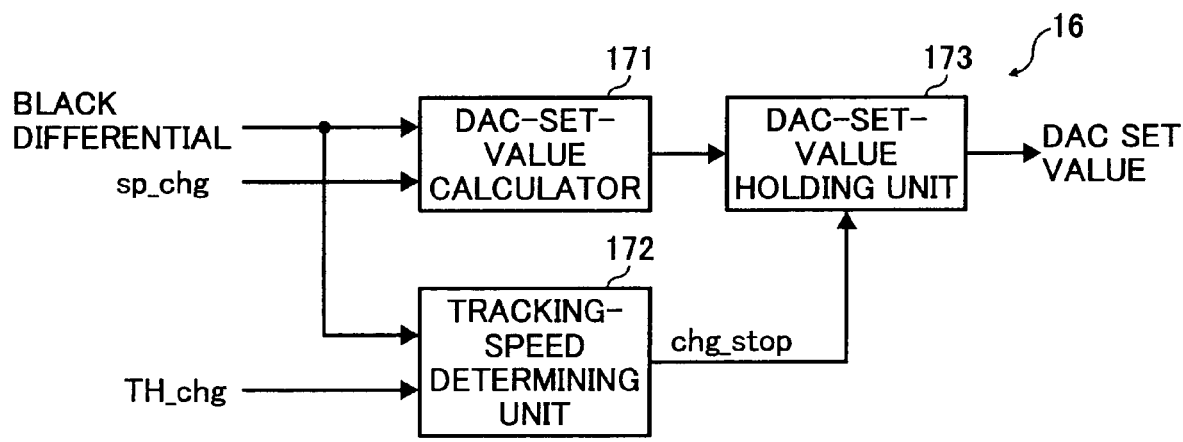
FIG. 10 is a block diagram of a configuration of a set value calculator according to a fourth embodiment of the present invention.

FIG. 10 is a block diagram of a configuration of the set value calculator 16 according to the fourth embodiment. As shown in FIG. 10, the set value calculator 16 according to the fourth embodiment includes a DAC set-value calculator 171, a tracking-speed determining unit 172, and a DAC-set-value holding unit 173.

The DAC set-value calculator 171 is a circuit that controls a reflection amount of the black differential component to the black correcting DAC 17, and can change the reflection amount based on the sp_shg signal.

The tracking-speed determining unit 172 updates and controls a DAC set value of the DAC-set-value holding unit 173 based on a black differential level. The tracking-speed determining unit 172 has inside a threshold level having a hysteresis characteristic, and controls the chg_stop signal by comparing the threshold level (black target tolerance) with the black differential.

The DAC-set-value holding unit 173 updates inside the set value from the DAC set-value calculator 171 when the chg_stop signal="H", and holds the updated set value, and stops updating the set value when the chg_stop signal="L".

Figure 11:
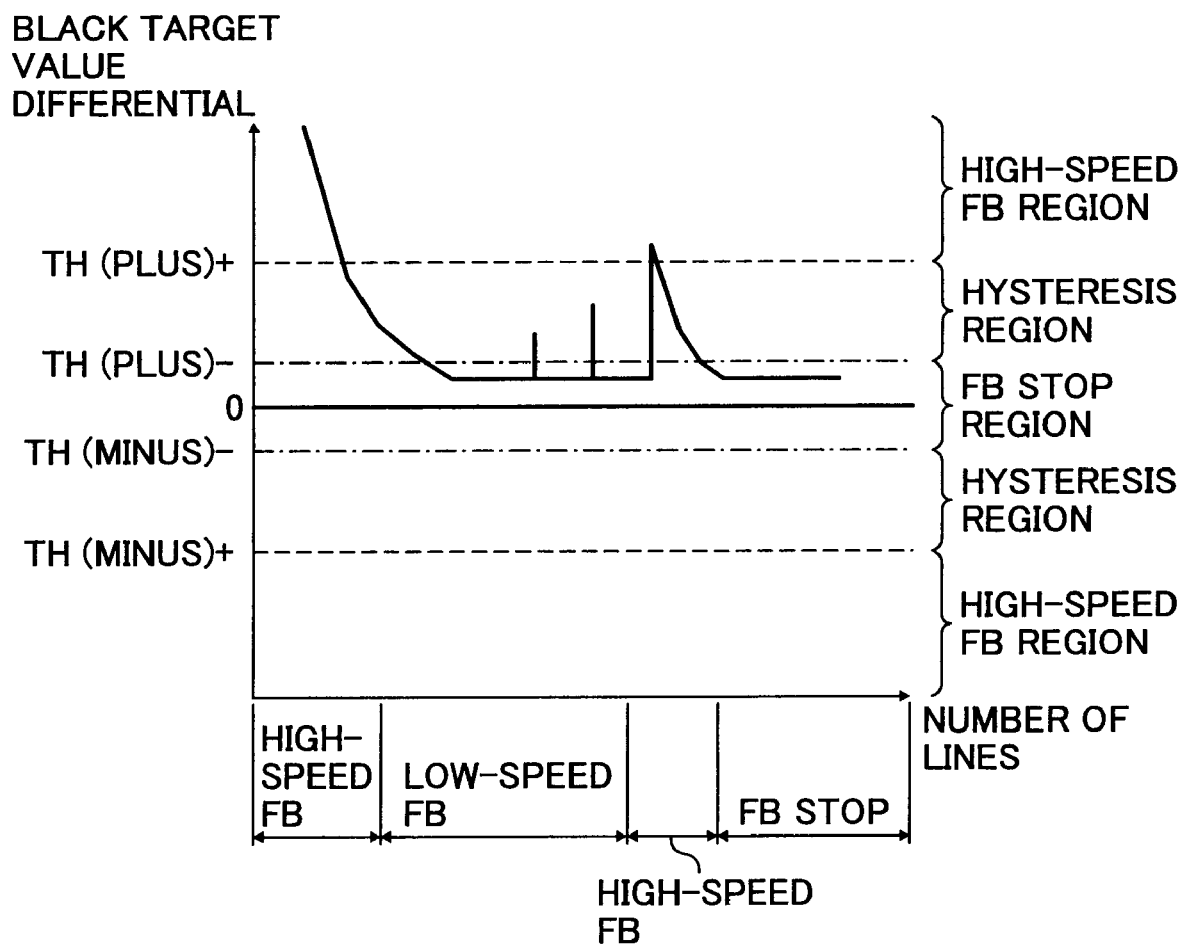
FIG. 11 is a graph of a threshold level of a tracking-speed determining unit.

FIG. 11 is a graph of a threshold level of the tracking-speed determining unit 172. In the graph shown in FIG. 11, the vertical axis represents a black differential, and the lateral axis represents a number of lines. To add a hysteresis characteristic to the threshold levels TH (plus) and TH (minus) of the tracking-speed determining unit 172, the TH (plus) has a threshold level of TH (plus)+ and TH (plus)-, and the TH (minus) has a threshold level of TH (minus)+ and TH (minus)-.

Therefore, according to the graph shown in FIG. 11, when the black differential value is tracked from the outside of TH (plus)+, an FB operation is stopped when the black differential becomes within TH (plus)-. Thereafter, the FB operation is suspended until when the black differential value becomes at the outside of TH (plus)+. With this arrangement, a black-level feedback due to noise attributable to the averaging precision of the black detection level can be prevented from being started.

As described above, according to the fourth embodiment, tracking due to noise can be decreased, by adding a hysteresis characteristic to the threshold level for comparing a black differential value.

A fifth embodiment of the present invention is explained next with reference to FIG. 12. Parts corresponding to those according to the first embodiment or the third embodiment are denoted with like reference numerals, and redundant explanations will be omitted.

In the fifth embodiment, the two kinds of threshold level held by the tracking-speed determining unit 163 shown in FIG. 6 have a hysteresis characteristic.

Figure 12:
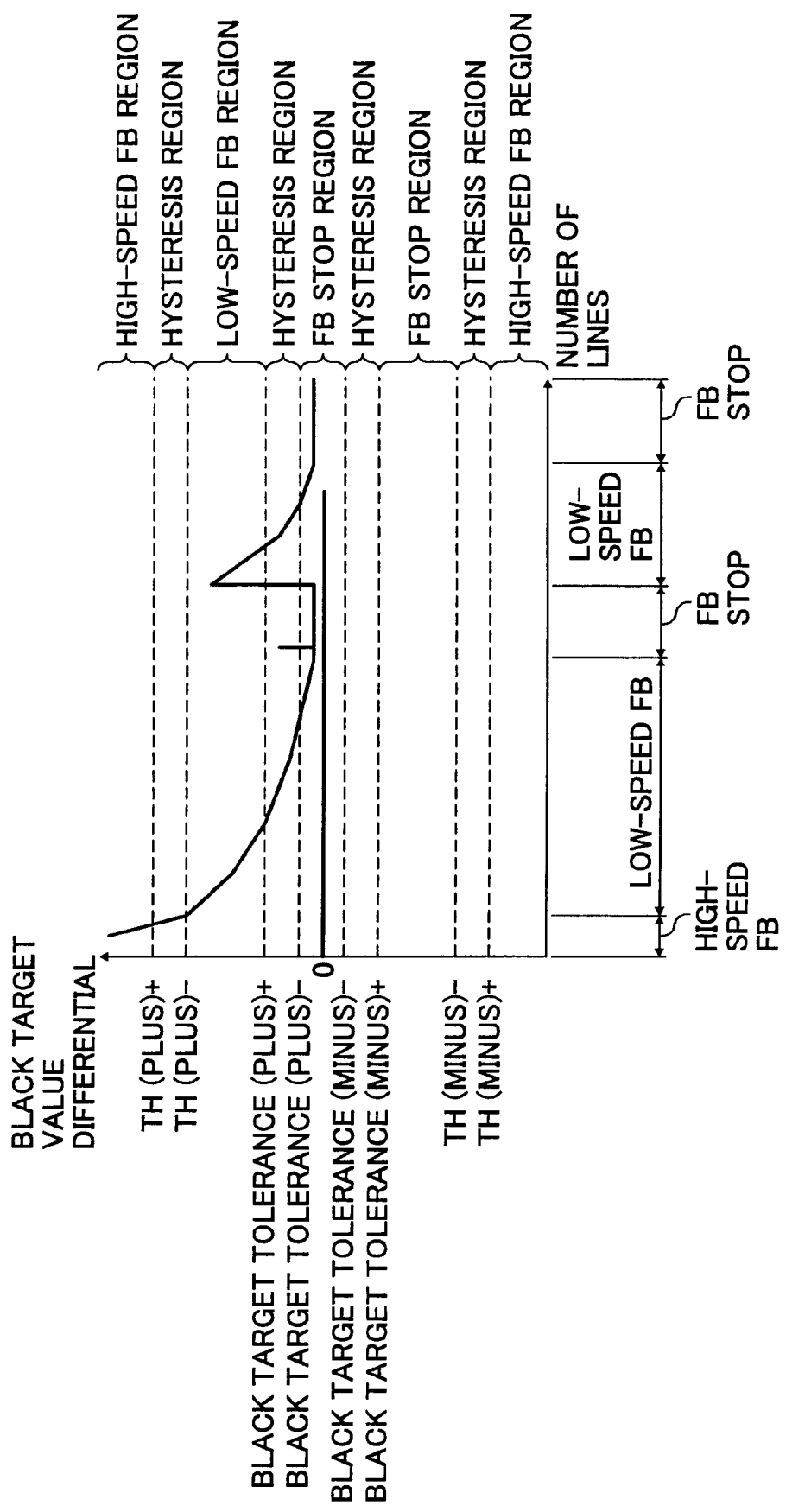
FIG. 12 is a graph of a threshold level of a tracking-speed determining unit according to a fifth embodiment of the present invention.

FIG. 12 is a graph of a threshold level of the tracking-speed determining unit 163 according to the fifth embodiment. In the graph shown in FIG. 12, the vertical axis represents a black differential, and the lateral axis represents a number of lines. To add a hysteresis characteristic to the first threshold levels TH (plus) and TH (minus) of the tracking-speed determining unit 163, the TH (plus) has a threshold level of TH (plus)+ and TH (plus)-, and the TH (minus) has a threshold level of TH (minus)+ and TH (minus)-. Further, to add a hysteresis characteristic to the second threshold levels of the black target tolerance (plus) and the black target tolerance (minus) of the tracking-speed determining unit 163, the black target tolerance (plus) has a threshold level of black target tolerance (plus)+ and black target tolerance (plus)-, and the black target tolerance (minus) has a threshold level of black target tolerance (minus)+ and black target tolerance (minus)-. In FIG. 12, a high-speed FB means a "large" setting of a black differential reflection amount, a low-speed FB means a "small" setting of a black differential reflection amount, and an FB stop means a stop of the FB (feedback) operation.

Therefore, according to the graph shown in FIG. 12, when the black differential value is tracked from the outside of TH (plus)+, a low-speed FB operation is carried out when the black differential becomes within TH (plus)-. Thereafter, the FB operation is suspended, when the black differential value becomes within the black target tolerance (plus)-. When the black differential exceeds the black target tolerance (plus)+, a low-speed FB operation is started, and when the black differential exceeds TH (plus)+, a high-speed FB operation is started.

As described above, according to the fifth embodiment, tracking due to noise can be decreased, by adding a hysteresis characteristic to the threshold level for comparing a black differential value.

A sixth embodiment of the present invention is explained next with reference to FIG. 13 and FIG. 14. Parts corresponding to those according to the first embodiment are denoted with like reference numerals, and redundant explanations will be omitted.

In contrast to the first to fifth embodiments described above, according to the sixth embodiment, a black-level detection is carried out at line intervals at which black-level variation phases coincide with each other, to avoid the offset variation of sub-scanning.

FIG. 13 is a block diagram of a configuration of the set value calculator 16 according to the sixth embodiment. As shown in FIG. 13, the set value calculator 16 according to the sixth embodiment includes a DAC-set-value calculation controller 181, and a DAC set-value calculator 182. The DAC-set-value calculation controller 181 controls the update timing of a set value of the DAC set-value calculator 182. XSLSYNC shown in FIG. 13 is a cycle signal of one line, and a line_sel signal is a line interval setting signal for executing a black-level feedback. The DAC-set-value calculation controller 181 generates a DAC_opent signal from the XSLSYNC signal and the line_sel signal.

FIG. 14 is a timing chart of timings of the XSLSYNC signal and the DAC_opcnt signal. In FIG. 14, the line_sel signal is applied to a setting of five lines. In this case, the DAC_opcnt signal becomes "H" at every five lines, and a set value of the DAC set-value calculator 182 is updated in the lines of only the "H" period. With this arrangement, the black-level feedback operation becomes possible at the line interval assigned by the line_sel signal.

As described above, according to the sixth embodiment, a black-level detection is carried out at line intervals at which the black-level variation phases coincide with each other, thereby avoiding the offset variation of sub-scanning. For example, when the phases of the black-level variation coincide with each other in the five-line unit, a black level can be always detected at the five-line intervals, so long as there is no variation factor.

A seventh embodiment of the present invention is explained next with reference to FIG. 15 and FIG. 16. Parts corresponding to those according to the first embodiment are denoted with like reference numerals, and redundant explanations will be omitted.

In the seventh embodiment, a black-level feedback operation is executed at the line interval assigned by the timing of the BLKCLP signal.

Figure 15:
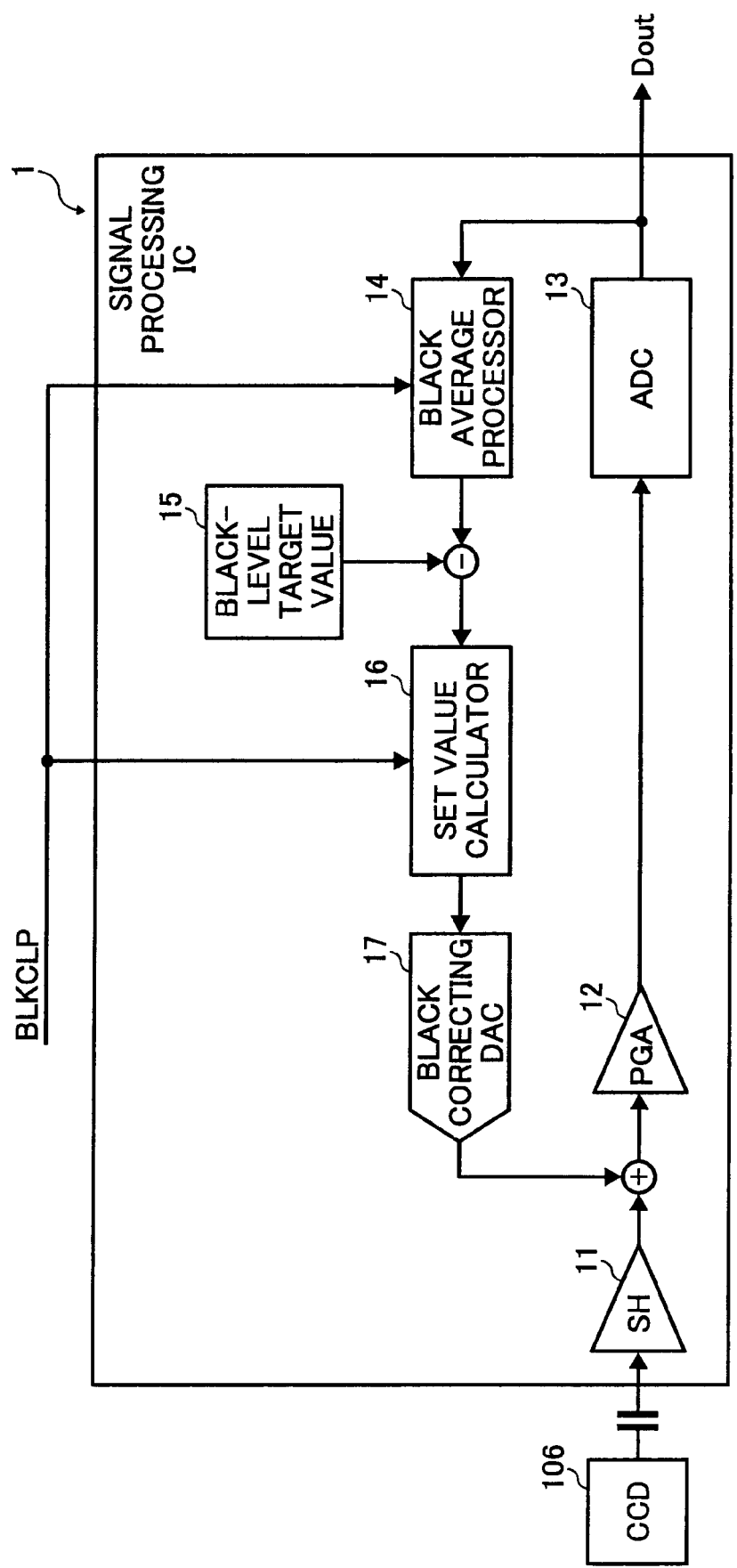
FIG. 15 is a block diagram of a configuration of a signal processing IC incorporated in an image scanner according to a seventh embodiment of the present invention.

FIG. 15 is a block diagram of a configuration of the signal processing IC 1 incorporated in the image scanner 100 according to the seventh embodiment. As shown in FIG. 15, according to the seventh embodiment, the black average processor 14 and the set value calculator 16 are controlled based on the BLKCLP signal. Usually, the black feedback operation is executed for each line. Therefore, based on the BLKCLP signal, the black-level period of each line CCD is set to "H", and the black-level average value processed by the black average processor 14 during this period is set to a black detection level. The set value calculator 16 updates the DAC set code from the black differential value.

Figure 16:
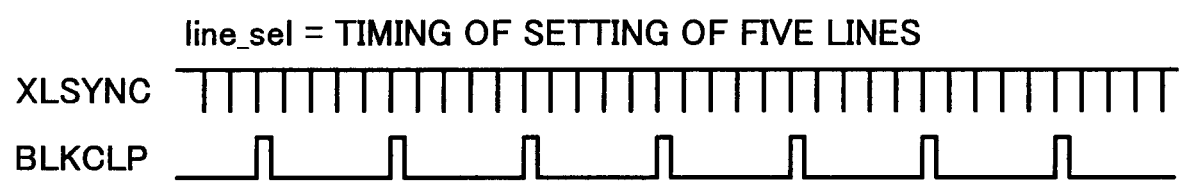
FIG. 16 is a timing chart of timings of an XSLSYNC signal and a BLKCLP signal.

FIG. 16 is a timing chart of timings of the XSLSYNC signal and the BLKCLP signal. In FIG. 16, the line_sel signal is applied to a setting of five lines. As shown in FIG. 16, when the BLKCLP signal is set to "H" at every five lines, the BLKCLP can be set active for only the assigned line. With this arrangement, the black-level feedback operation becomes possible at the assigned line intervals.

As described above, according to the seventh embodiment, a line interval of the black-level feedback operation can be assigned from the outside, by assigning the execution line interval of the black-level feedback control. When a black level is detected at the line interval at which the black-level variation phases coincide with each other, the offset variation of sub-scanning can be avoided.

An eighth embodiment of the present invention is explained next with reference to FIG. 17 and FIG. 18. Parts corresponding to those according to the first embodiment are denoted with like reference numerals, and redundant explanations will be omitted.

Figure 17:
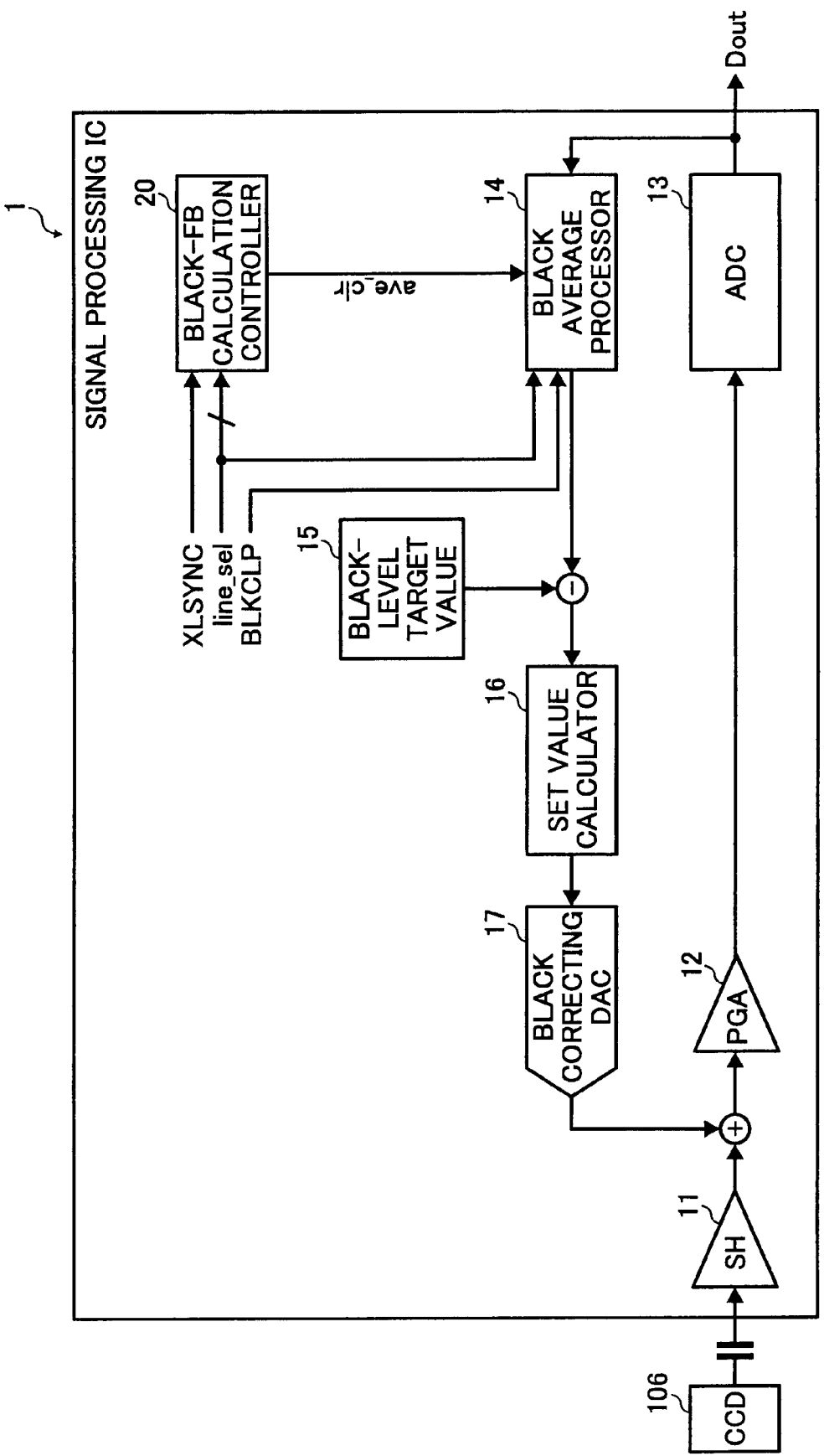
FIG. 17 is a block diagram of a configuration of a signal processing IC incorporated in an image scanner according to an eighth embodiment of the present invention.

FIG. 17 is a block diagram of a configuration of the signal processing IC 1 incorporated in the image scanner 100 according to the eighth embodiment. As shown in FIG. 17, the signal processing IC 1 according to the eighth embodiment includes a black-FB calculation controller 20, in addition to the signal processing IC 1 shown in FIG. 2 according to the first embodiment. The black-FB calculation controller 20 is a circuit that generates an ave_clr signal at a line interval assigned by the line_sel signal.

Figure 18:
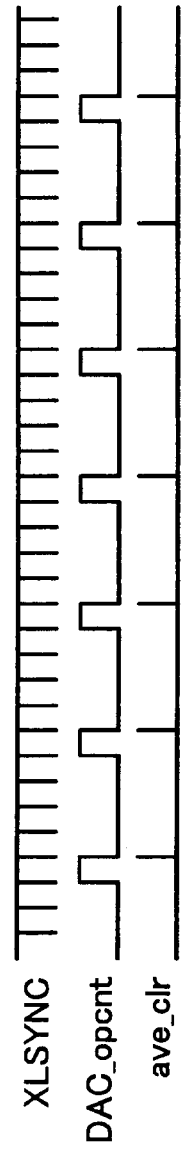
FIG. 18 is a timing chart of timings of an XSLSYNC signal, a DAC_opcnt signal, and an ave_clr signal.

FIG. 18 is a timing chart of timings of the XSLSYNC signal, the DAC_opcnt signal, and the ave_clr signal. In FIG. 18, the line_sel signal is applied to a setting of five lines. As shown in FIG. 18, the ave_clr signal is set to "H" at every five lines, and the black detection level of the black average processor 14 is cleared. After the clearing, the average processing is carried out during each line "H" period of the BLKCLP signal. The average value of five lines during the BLKCLP signal="H" period is generated as the black detection level in lines where the DAC_opcnt signal="H". With this arrangement, the black-level feedback operation is carried out at five-line intervals at the black detection level during the BLKCP signal "H" period of five lines.

As described above, according to the eighth embodiment, in the black-level feedback control, a center value of the black-level variation can be detected by calculating a black level from the average value during a line period when the black-level variation phases coincide with each other. Accordingly, the center value of the black-level variation can be set as a black-level target value, thereby avoiding the offset variation of sub-scanning.

A ninth embodiment of the present invention is explained next with reference to FIG. 19. Parts corresponding to those according to the first embodiment are denoted with like reference numerals, and redundant explanations will be omitted.

Figure 19:
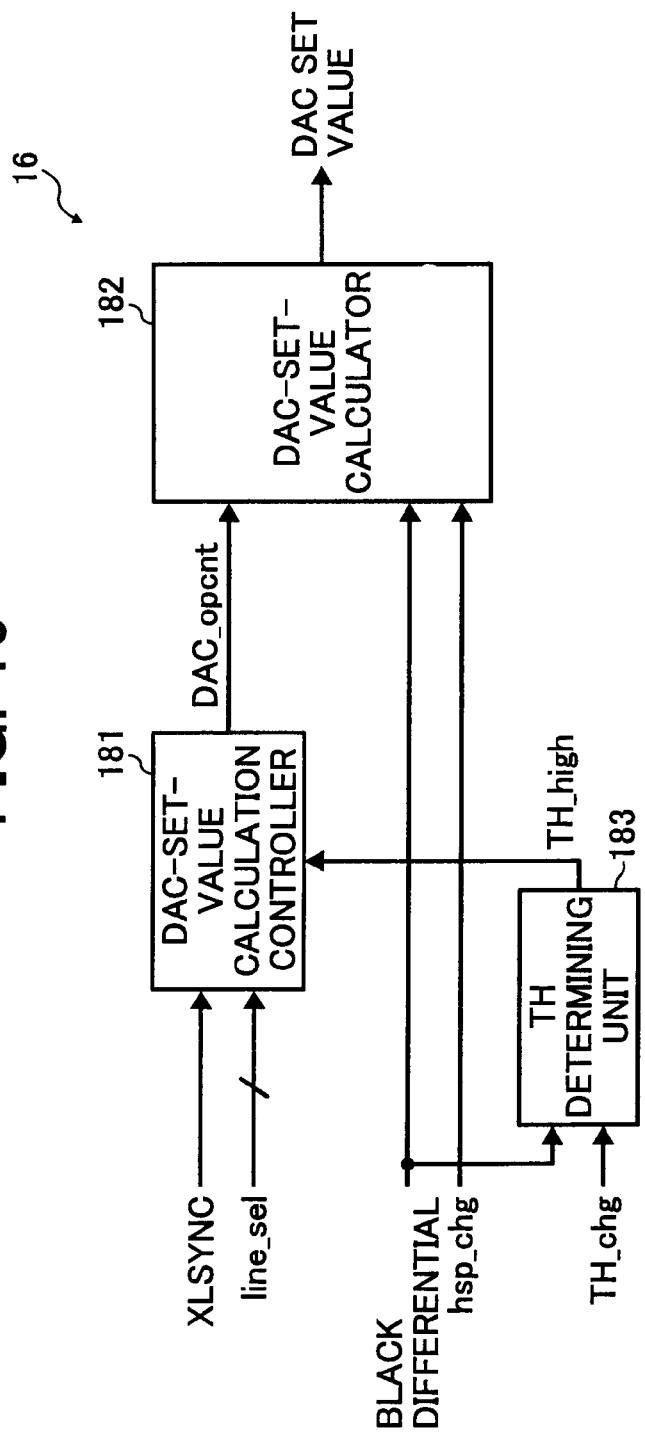
FIG. 19 is a block diagram of a configuration of a set value calculator according to a ninth embodiment of the present invention.

FIG. 19 is a block diagram of a configuration of the set value calculator 16 according to the ninth embodiment. As shown in FIG. 19, the set value calculator 16 according to the ninth embodiment includes a threshold level (TH) determining unit 183, in addition to the configuration of the set value calculator 16 shown in FIG. 13 according to the sixth embodiment.

The TH determining unit 183 controls the DAC-set-value calculation controller 181 based on a black differential value. As shown in FIG. 19, the TH determining unit 183 can change the threshold level of the black differential level based on the TH_chg signal.

When the black differential value exceeds the threshold level, the TH determining unit 183 sets the TH_high signal to "H". With this arrangement, the DAC-set-value calculation controller 181 fixes the DAC_opcnt signal to "H", thereby executing black-level feedback for each line. When the black differential value becomes equal to or smaller than the threshold level, the TH determining unit 183 sets the TH_high signal to "L". With this arrangement, the DAC_opcnt signal becomes "H"-active at line intervals of the line_sel signal setting. The DAC-set-value calculation controller 181 generates inside the DAC_opcnt signal at line intervals of the line_sel signal setting, even when the DAC-set-value calculation controller 181 fixes the DAC_opcnt signal to "H". Therefore, there is no risk that the synchronization of the line interval is not deviated at the above change time.

As described above, according to the ninth embodiment, when the threshold level circuit that compares the black differential value with the threshold level determines that the black differential value exceeds the threshold level, the black-level feedback control is executed for each line, regardless of the assignment of the execution line interval. Accordingly, a high-speed tracking is possible when the black level changes other than the cycle variation of the SSCG, and the offset variation of sub-scanning can be avoided.

A tenth embodiment of the present invention is explained next with reference to FIG. 20. Parts corresponding to those according to the first embodiment are denoted with like reference numerals, and redundant explanations will be omitted.

In the first embodiment, the black-level feedback operation is executed at line intervals assigned by the timing of the BLKCLP signal. However, in the tenth embodiment, the "H" period of the BLKCLP signal is set as the cycle of the black-level variation.

Figure 20:
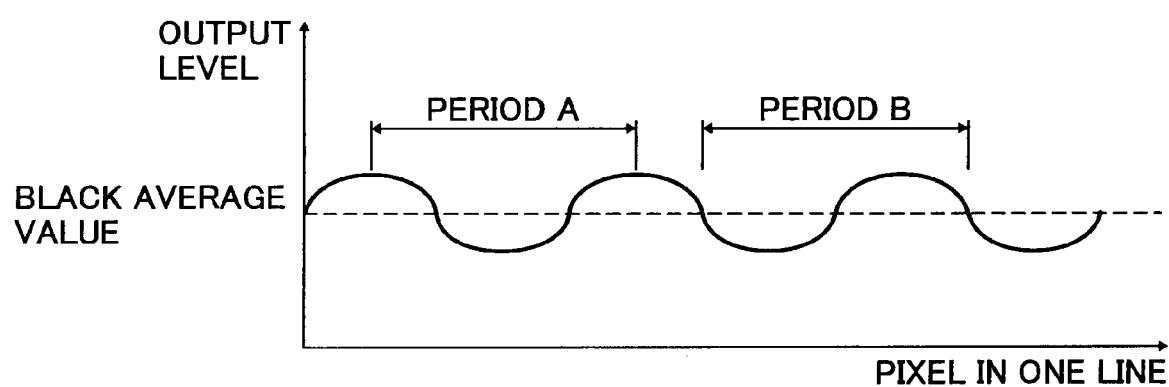
FIG. 20 is a schematic of an "H" period of a BLKCLP signal according to a tenth embodiment of the present invention.
Figure 21:
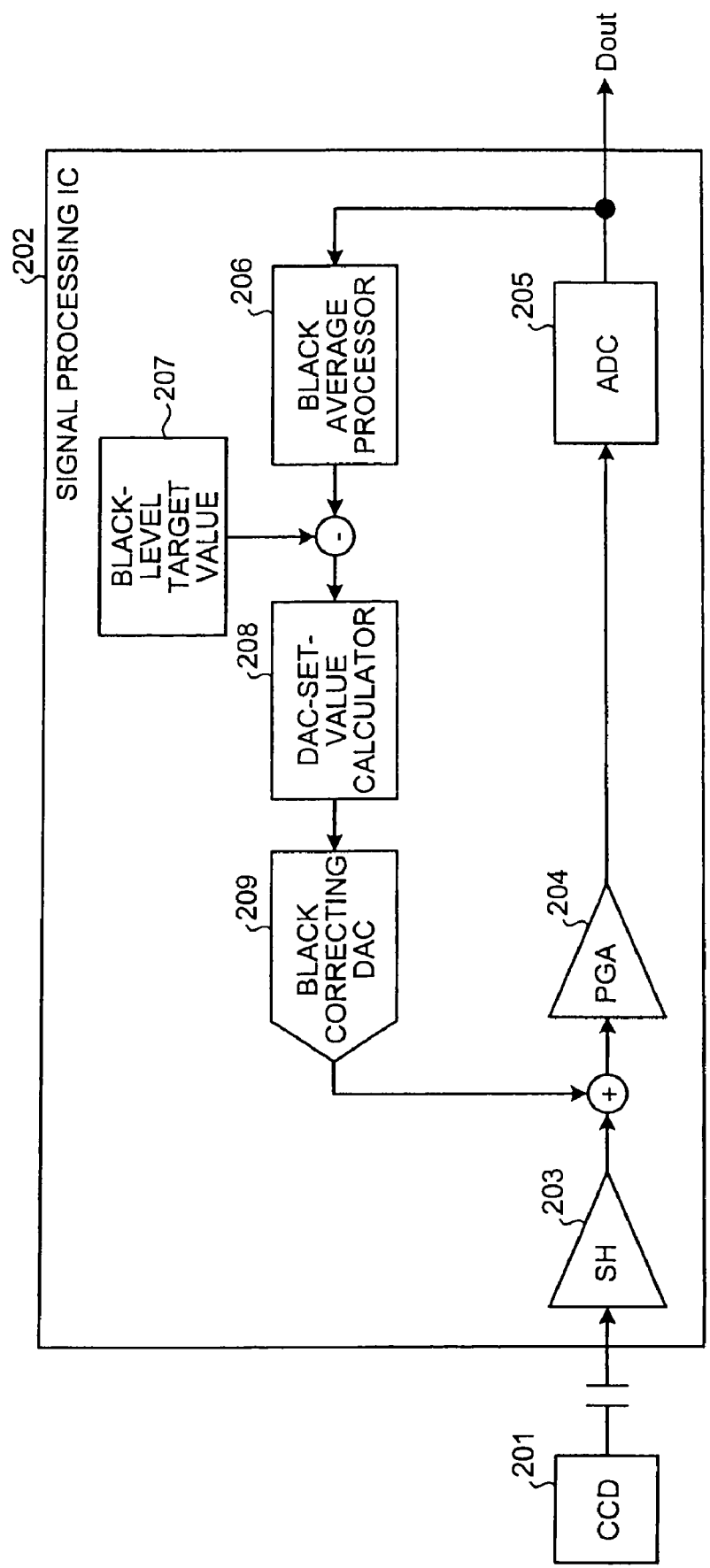
FIG. 21 is a block diagram of a configuration of a signal processing IC incorporated in a conventional image reading device.
Figure 22:
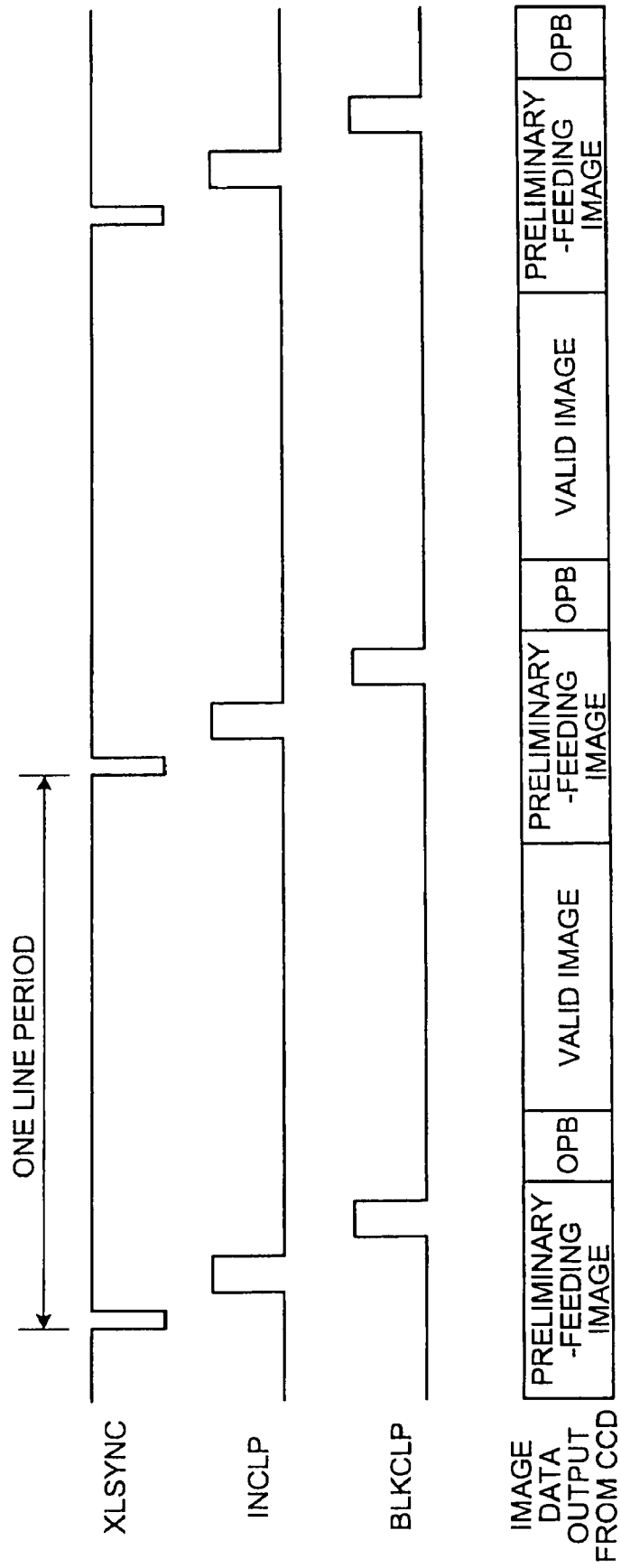
FIG. 22 is a schematic of an image format of image data output from a CCD.
Figure 23:
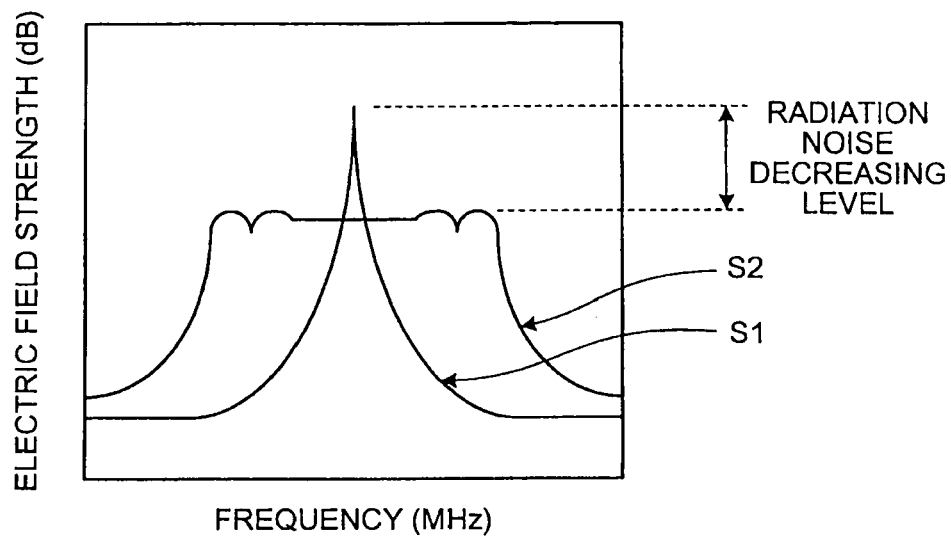
FIG. 23 is graph of frequency spread by an SSCG.
Figure 24:
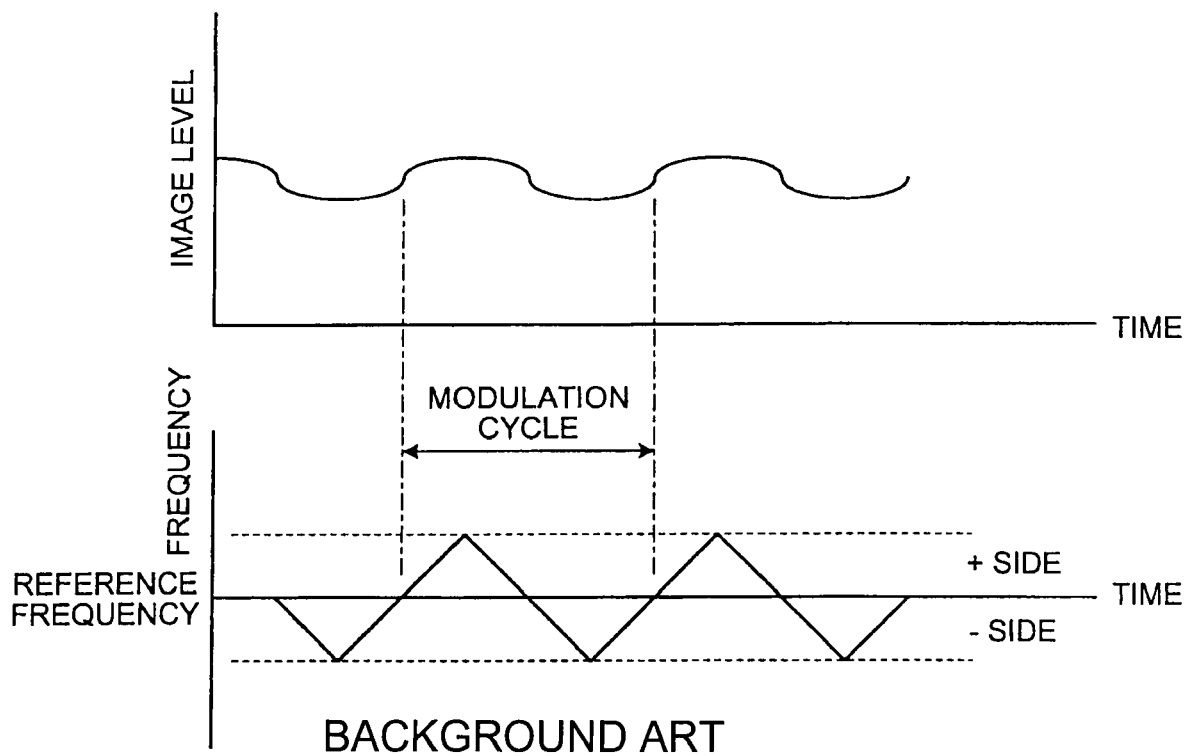
FIG. 24 is a graph of occurrence of high and low image levels.
Figure 25:
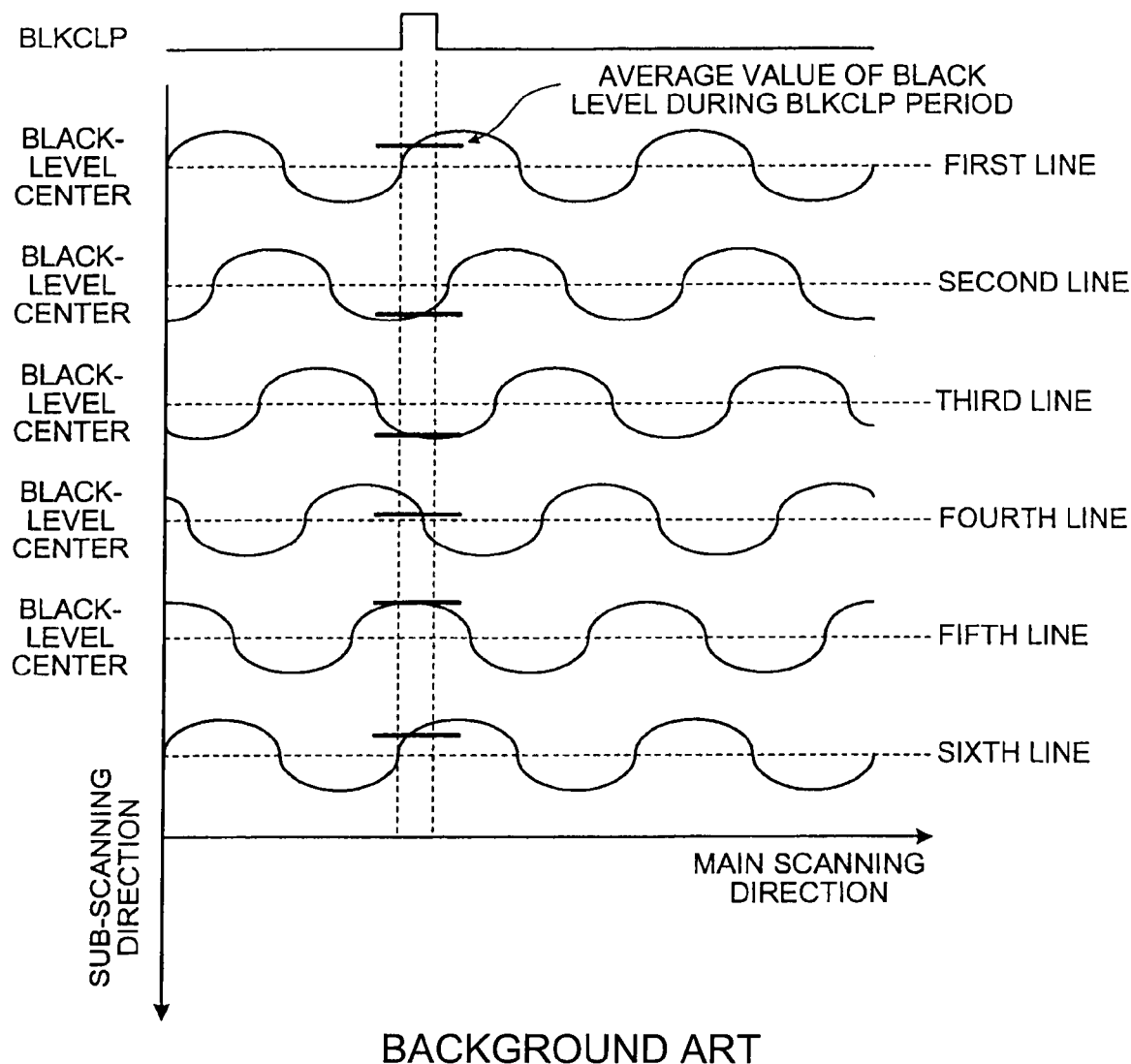
FIG. 25 is a schematic of a process in which a sub-scanning image level variation occurs.

FIG. 20 is a schematic of the "H" period of the BLKCLP signal according to the tenth embodiment. As shown in FIG. 20, the black detection level becomes a black average value, even when the BLKCLP signal becomes "H" during a period A or a period B as the "H" period or in other phases.

As described above, according to the tenth embodiment, a center value of the black-level variation can be always detected. Accordingly, the center value of the black-level variation can be set as a black-level target value, thereby avoiding the offset variation of sub-scanning.

According to an aspect of the present invention, the offset variation of sub-scanning can be decreased, by controlling the tracking speed of the black-level feedback based on the gain and the black differential value.

According to another aspect of the present invention, a threshold level of the black differential level can be changed.

According to still another aspect of the present invention, to cope with the image level variation due to the SSCG, the tracking is slowed down. To cope with the image level variation due to smear, the tracking speed is increased. With this arrangement, a variation of the sub-scanning offset level attributable to the image level variation due to the SCCG can be decreased.

According to still another aspect of the present invention, in controlling the tracking speed of the black-level feedback based on the gain and the black differential value, the black-level feedback is stopped within a constant range of the black differential value, thereby avoiding the offset variation of sub-scanning.

According to still another aspect of the present invention, in controlling the tracking speed of the black-level feedback based on the gain and the black differential value, the black-level feedback is stopped within a range of threshold levels in which the black differential value can be permitted as a black-level variation. Accordingly, the black-level feedback operation is suspended so long as the black-level variation does not exceed the threshold level. Accordingly, the image-level variation due to the SSCG is not tracked in the range in which the black differential value can be permitted as a black-level variation.

According to still another aspect of the present invention, a threshold level for comparing black-level differential values has a hysteresis characteristic, thereby decreasing the tracking due to noise.

According to still another aspect of the present invention, a black level feedback control is carried out at the line interval at which the black-level variation phases coincide with each other, that is, the black-level detection is carried out at line intervals at which the black-level variation phases coincide with each other, thereby avoiding the offset variation of sub-scanning due to the black-level feedback even when the image varies cyclically. When the phases of the black-level variation coincide with each other in the five-line unit, a black level can be always detected at the five-line intervals, so long as there is no variation factor.

According to still another aspect of the present invention, a line interval of the black-level feedback control can be assigned based on the external control signal. Accordingly, the line interval of the black-level feedback operation can be assigned from the outside.

According to still another aspect of the present invention, in the black-level feedback control, a center value of the black-level variation can be detected by calculating a black level from the average value during a line period when the black-level variation phases coincide with each other. Accordingly, the center value of the black-level variation can be set as a black-level target value, thereby avoiding the offset variation of sub-scanning.

According to still another aspect of the present invention, when the differential value comparing unit that compares the black differential value with the threshold level determines that the black differential value exceeds the threshold level, the black-level feedback control is executed for each line, regardless of the assignment of the execution line interval. Accordingly, a high-speed tracking is possible when the black level changes other than the cycle variation of the SSCG, and the offset variation of sub-scanning can be avoided.

According to still another aspect of the present invention, a black-level detection period is set as a black-level variation cycle. With this arrangement, a center value of the black-level variation can be always detected. The center value of the black-level variation can be set as a black-level target value, thereby avoiding the offset variation of sub-scanning.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A black-level feedback device that executes a black-level feedback control that includes converging a black detection level to a black-level target value, based on a black differential value between the black detection level obtained by averaging assigned pixels of image data in one line output from a photoelectric conversion element during a black-level period or a period corresponding to a black level and the black-level target value determined in advance, the black-level feedback device comprising:
   a first set-value calculating unit that calculates and outputs a first set value of a black-level feedback based on a reflection amount that increases a speed of tracking to the black-level target value in the black-level feedback control;
   a second set-value calculating unit that calculates and outputs a second set value of a black-level feedback based on a reflection amount that slows down a speed of tracking to the black-level target value as compared to the speed of tracking of the first set-value calculating unit;
   a selecting unit that selects any one of the first set value and the second set value and outputs selected value as a set value; and
   a controlling unit that controls selection of any one of the first set value and the second set value by the selecting unit based on the black differential value and a gain of the image data, wherein
   the controlling unit causes the second set-value calculating unit to slow down the tracking of the image level variation due to a spread spectrum clock generator (SSCG), and causes the first set-value calculating unit to speed-up the tracking the image level variation due to smear when controlling the selection by the selecting unit.

2. The black-level feedback device according to claim 1, wherein the controlling unit controls a threshold level based on the gain of the image data when controlling the selection by the selecting unit.

3. The black-level feedback device according to claim 1, wherein the controlling unit controls the output of the selecting unit according to the black differential value and the gain of the image data, and stops the black-level feedback within a constant range of the black differential value, at the time of selecting the output from the first set-value calculating unit or the output from the second set-value calculating unit.

4. The black-level feedback device according to claim 3, wherein the constant range is a range within threshold levels in which the black differential value can be permitted as a black-level variation.

5. The black-level feedback device according to claim 4, wherein the threshold levels have a hysteresis characteristic.

6. An image reading device that executes, at the time of outputting a digital image signal after reading an image by a photoelectric converting element, a black-level feedback control that includes converging a black detection level to a black-level target value, based on a black differential value between the black detection level obtained by averaging assigned pixels of image data in one line output from the photoelectric conversion element during a black-level period or a period corresponding to a black level and the black-level target value determined in advance, the image reading device comprising:
   a first set-value calculating unit that calculates and outputs a first set value of a black-level feedback based on a reflection amount that increases a speed of tracking to the black-level target value in the black-level feedback control;

a second set-value calculating unit that calculates and outputs a second set value of a black-level feedback based on a reflection amount that slows down a speed of tracking to the black-level target value as compared to the speed of tracking of the first set-value calculating unit;

a selecting unit that selects any one of the first set value and the second set value and outputs selected value as a set value; and a controlling unit that controls selection of any one of the first set value and the second set value by the selecting unit based on the black differential value and a gain of the image data, wherein the controlling unit causes the second set-value calculating unit to slow down the tracking of the image level variation due to a spread spectrum clock generator (SSCG), and causes the first set-value calculating unit to speed-up the tracking the image level variation due to smear when controlling the selection by the selecting unit.

7. The image reading device according to claim 6, wherein the controlling unit controls a threshold level based on the gain of the image data when controlling the selection by the selecting unit.

8. The image reading device according to claim 6, wherein the controlling unit controls the output of the selecting unit according to the black differential value and the gain of the image data, and stops the black-level feedback within a constant range of the black differential value, at the time of selecting the output from the first set-value calculating unit or the output from the second set-value calculating unit.

9. The image reading device according to claim 8, wherein the constant range is a range within threshold levels in which the black differential value can be permitted as a black-level variation.

10. The image reading device according to claim 9, wherein the threshold levels have a hysteresis characteristic.

* * * * *